(12) United States Patent
Lupp et al.

(10) Patent No.: US 10,360,208 B2
(45) Date of Patent: Jul. 23, 2019

(54) METHOD AND SYSTEM OF PROCESS RECONSTRUCTION

(71) Applicant: Software AG, Darmstadt (DE)

(72) Inventors: Michael Lupp, Merchweiler (DE); Thomas Backes, Rheinstetten (DE); Heiko Schuetz, Tholey (DE)

(73) Assignee: Software AG, Darmstadt (DE)

( * ) Notice: Subject to any disclaimer, the term of this patent is extended or adjusted under 35 U.S.C. 154(b) by 710 days.

(21) Appl. No.: 14/576,857

(22) Filed: Dec. 19, 2014

(65) Prior Publication Data

US 2016/0179851 A1    Jun. 23, 2016

(51) Int. Cl.
  *G06F 16/21* (2019.01)
  *G06F 16/23* (2019.01)
  *G06F 16/185* (2019.01)

(52) U.S. Cl.
  CPC ........ *G06F 16/2365* (2019.01); *G06F 16/185* (2019.01); *G06F 16/212* (2019.01)

(58) Field of Classification Search
  CPC ............ G06F 17/30294; G06F 16/212; G06Q 10/063; G06Q 10/0637; G06Q 10/0639; H04L 43/04
  See application file for complete search history.

(56) References Cited

U.S. PATENT DOCUMENTS

| | | | | |
|---|---|---|---|---|
| 7,058,861 B1* | 6/2006 | Adams | ................ | H04L 41/0853 709/223 |
| 7,092,484 B1* | 8/2006 | Jensen | ................... | B22D 46/00 164/250.1 |
| 8,676,627 B2 | 3/2014 | Gerth et al. | | |
| 2003/0176931 A1* | 9/2003 | Pednault | ........... | G06F 17/30539 700/31 |
| 2003/0217162 A1* | 11/2003 | Fu | ........................... | H04L 29/06 709/229 |
| 2004/0243593 A1* | 12/2004 | Stolte | ................ | G06F 17/30592 |
| 2005/0171833 A1 | 8/2005 | Jost et al. | | |
| 2010/0145746 A1* | 6/2010 | Gerth | ................... | G06Q 10/063 705/7.11 |
| 2010/0205370 A1* | 8/2010 | Ikawa | ................... | G06F 3/0625 711/114 |
| 2012/0005690 A1 | 1/2012 | Houck et al. | | |
| 2016/0292591 A1* | 10/2016 | Guirguis | .............. | G06N 99/005 |

* cited by examiner

*Primary Examiner* — Robert W Beausoliel, Jr
*Assistant Examiner* — Nirav K Khakhar
(74) *Attorney, Agent, or Firm* — Posz Law Group, PLC

(57) ABSTRACT

A method is provided for process reconstruction, including extracting system type attributes and associated system identification attributes from pieces of data, each system type attribute containing information identifying the type of system that generated the data, and each system identification attribute containing information identifying the system that generated the data; extracting a process identification attribute from the pieces of data that identifies the pieces of data as belonging to a process instance; determining a hierarchy of functions based on a grouping operation, the hierarchy being based on the system type attributes and the system identification attributes; generating a configuration file for applying reconstruction methods that is set to selectively apply each of the reconstruction methods based on the hierarchy of functions and a mapping table that pairs the system type attributes and the reconstruction methods; and applying the reconstruction methods to the pieces of data according to the configuration file.

24 Claims, 12 Drawing Sheets

METHOD AND SYSTEM OF PROCESS RECONSTRUCTION

TECHNICAL FIELD

The technical field relates in general to the reconstruction of a business process based on a reassembling of individual documents associated with the business process.

BACKGROUND

Business processes generally involve multiple steps executed at different times and at different locations, each generating one or more documents. These documents are often stored in multiple databases that each use a different format, which can make it more difficult to reconstruct the process based on the information in the multiple documents.

A business process can contain different types of process steps, e.g., fully manual executed steps, partially manual steps supported by an information technology (IT) system, or fully automated steps executed by an IT system only.

Business processes steps that are supported or executed by an IT system usually are characterized in that they can be measured easily, if the relevant data is saved e.g. in a database during the step execution. Fully manual steps need to be entered into an IT system by hand so that they can be used for an IT based process optimization.

Business process management (BPM) is a management discipline that focuses on improving corporate performance by managing and optimizing a company's business processes. It can therefore be described as a "process optimization process."

One part of process optimization is process monitoring. Monitoring encompasses the tracking of individual processes, so that information on their state can be easily seen, and statistics on the performance of the processes can be provided.

Monitoring process instances generally involves extracting data of process steps, detecting the process steps that belong to one single process instance, and then reconstructing the process flow of a process instance based off the data of the steps. This allows the use of data for determining the key performance indicators (KPIs, sometimes called measures) and dimensions that can be applied in analyzing the process instances.

There are several modelling notations for business processes available, such as event-driven process chain (EPC), business process model and notation (BPMN), and the like. For example, EPC is a type of flowchart used for business process modelling. EPCs can be used to describe an enterprise resource planning (ERP) implementation, and for business process improvement.

There are also many tools for process monitoring on the market, e.g., Process Performance Manager by Software AG, QPR ProcessAnalyzer by QPR Software, and Fluxicon Disco by Fluxicon.

Process Performance Manager (PPM) provides the user with a complete solution for business process monitoring (i.e., process controlling), which unites extraction, processing, query, and analysis of process data.

However, when using PPM, data may be extracted from multiple different source systems, e.g., a structured query language (SQL) database, a comma-separated values (CSV) files, etc. These different sources can be saved in extensible markup language (XML) files in event format and imported by PPM as process fragments for process reconstruction.

Thus, during the process of reconstructing an original process, the system will extract the data from these individual source systems and save it in a PPM-specific XML data format, e.g., event format. This source data will be imported as process fragments into a PPM database.

Once the individual process fragments are gathered, it is necessary to combine them into a complete process instance. This combining and ordering process can be referred to as a process merge.

Then, once the process instance is reconstructed, the system can create corresponding KPIs and dimensions for the process instance and the process elements. The prepared data can then be saved in the PPM database and be made available for further analysis by PPM.

However, because the various process fragments can be stored in different formats, in many cases it has been impossible to automatically reconstruct the process instance. In such situations, some human intervention is required to fully reconstruct the process instance from the process fragments.

SUMMARY

Accordingly, one or more embodiments provide a method, system and/or non-transitory computer readable medium for process reconstruction.

One embodiment provides a method for process reconstruction, the method including: extracting a plurality of system type attributes and a plurality of associated system identification attributes from a plurality of pieces of data generated by a plurality of function fragments, respectively, each system type attribute containing information identifying the type of system that generated the data, and each system identification attribute containing information identifying the system that generated the data; extracting a process identification attribute from the plurality of pieces of data generated by the plurality of function fragments, respectively, the process identification attribute identifying the plurality of pieces of data as belonging to a process instance; determining a hierarchy of functions based on a grouping operation, the hierarchy being based on the plurality of system type attributes and the plurality of system identification attributes; generating a configuration file for applying a plurality of reconstruction methods, the configuration file being set to selectively apply each of the reconstruction methods based on the hierarchy of functions and a predetermined mapping table, the mapping table pairing the system type attributes and the reconstruction methods; and applying the reconstruction methods to the plurality of pieces of data generated by the function fragments in accordance with the configuration file.

The reconstruction methods may include at least one of a sort merge, a key merge, and a process template merge.

The configuration file may be editable by a user.

The grouping operation may further include performing a first grouping operation on a plurality of functions stored in one or more memory modules to extract an unsorted first group of functions from the one or more memory modules based on the process identification attribute; performing a second grouping operation on the unsorted first group of functions to extract an unsorted second group of functions from the unsorted first group of functions based on a first first-level grouping attribute; and performing a third grouping operation on the unsorted first group of functions to extract an unsorted third group of functions from the unsorted first group of functions based on the first first-level grouping attribute.

The configuration file may be configured to apply a third reconstruction method to the unsorted third group of functions based on one or more third merging attributes contained in the unsorted third group of functions to generate a sorted third group of functions, apply a second reconstruction method to the unsorted second group of functions based on one or more second merging attributes contained in the unsorted second group of functions to generate a sorted second group of functions, and apply a first reconstruction method to the sorted second and third groups of functions based on one or more first merging attributes contained in the sorted second and third groups of functions to generate a sorted first group of functions, and the first merging attributes, the second merging attributes, and the third merging attributes may include at least two different types of merging attributes.

The at least two different types of merging attributes may include integer time stamp merging attributes and predecessor reference merging attributes.

The grouping operation may further include performing a fourth grouping operation on the unsorted first group of functions to extract an unsorted fourth group of functions from the unsorted first group of functions based on a second first-level grouping attribute; and the configuration file may be further configured to apply a fourth reconstruction method to the unsorted fourth group of functions based on one or more fourth merging attributes contained in the unsorted fourth group of functions to generate a sorted fourth group of functions, and the fourth reconstruction method may be applied to the sorted second, third, and fourth groups of functions based on one or more first merging attributes contained in the sorted second, third, and fourth groups of functions to generate the sorted first group of functions.

The grouping operation may further include performing a fifth grouping operation on the unsorted second group of functions to extract an unsorted fifth group of functions from the unsorted second group of functions based on a second-level grouping attribute, and performing a sixth grouping operation on the unsorted second group of functions to extract an unsorted sixth group of functions from the unsorted second group of functions based on the second-level grouping attribute, the configuration file may be further configured to apply a fifth reconstruction method to the unsorted fifth group of functions based on one or more fifth merging attributes contained in the unsorted fifth group of functions to generate a sorted fifth group of functions, and apply a sixth reconstruction method to the unsorted sixth group of functions based on one or more sixth merging attributes contained in the unsorted sixth group of functions to generate a sorted sixth group of functions, and the applying of the second reconstruction method to the unsorted second group of functions may include applying of the second reconstruction method to the sorted fifth group of functions and the sorted sixth group of functions based on the one or more second merging attributes contained in the unsorted second group of functions to generate the sorted second group of functions.

It should be noted that also disclosed herein are a system and non-transitory, computer readable storage medium featuring the functionality immediately-above described.

One, or a combination of more than one, or all, of the above embodiments, can be combined and provided as a single embodiment.

Moreover, the purpose of the abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

I. Overview

In overview, the present disclosure concerns enabling the use of different types of process reconstruction (i.e., merge methods) in a single process instance, and the ability to switch between them. The general concept is to provide a method to recursively split a process instance into different (hierarchical) parts/groups that belong together, so that every part can be reconstructed with a specific merge method, and to provide a method to combine the groups together even if they employ different reconstruction methods.

II. Basic Reconstruction

Figure 1:
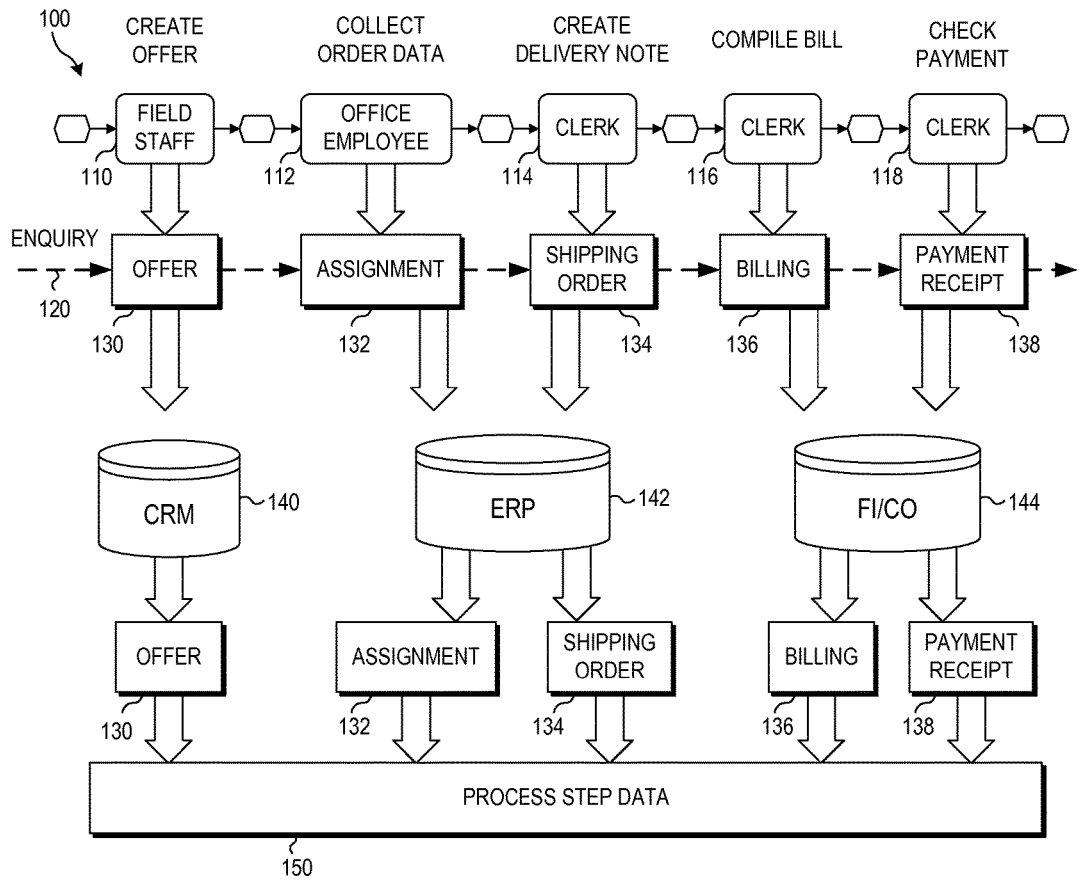
FIG. 1 is a process flow diagram describing an exemplary process instance and the related data generated during the execution of the process steps that are saved in different IT systems, according to disclosed embodiments.

FIG. 1 is a process flow diagram describing an exemplary process instance 100 and the related data (i.e., documents)

generated during the execution of the process steps that are saved in different IT systems, according to disclosed embodiments.

As shown in FIG. 1, five people are involved in five different steps in this exemplary process instance: a field staff member 110, an office employee 112, a first clerk 114, a second clerk 116, and a third clerk 118. These five people generate five documents: an offer 130, an assignment 132, a shipping order 134, a billing notice 136, and a payment receipt 138, respectively. These documents are stored in electronic form in three separate databases: a customer relationship management (CRM) database 140, an enterprise resource planning (ERP) database 142, and a financial accounting/controlling module (FI/CO) database 144.

When an inquiry 120 comes in, the process 100 begins by having the field staff member 110 generate the offer 130. This offer 130 is then stored in the CRM database 140. After the offer 130 is generated, the office employee 112 generates an assignment 132, which is stored in the ERP database 142. Next, the first clerk 114 generates the shipping order 134, which is also stored in the ERP database 142. Then, the second clerk 116 generates the billing notice 136, which is stored in the FI/CO database 144. Finally, the third clerk 118 generates the payment receipt 138, which is also stored in the FI/CO database 144.

In alternate embodiments, more or fewer steps can be involved, employing more or fewer people, and generating more or fewer documents. Likewise, more or fewer than three databases could also be used.

Figure 4:
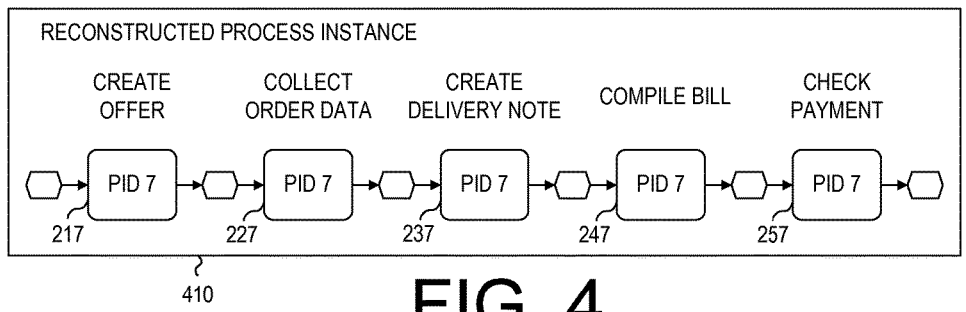
FIG. 4 is a block diagram showing a reconstructed process instance, according to disclosed embodiments.
Figure 2:
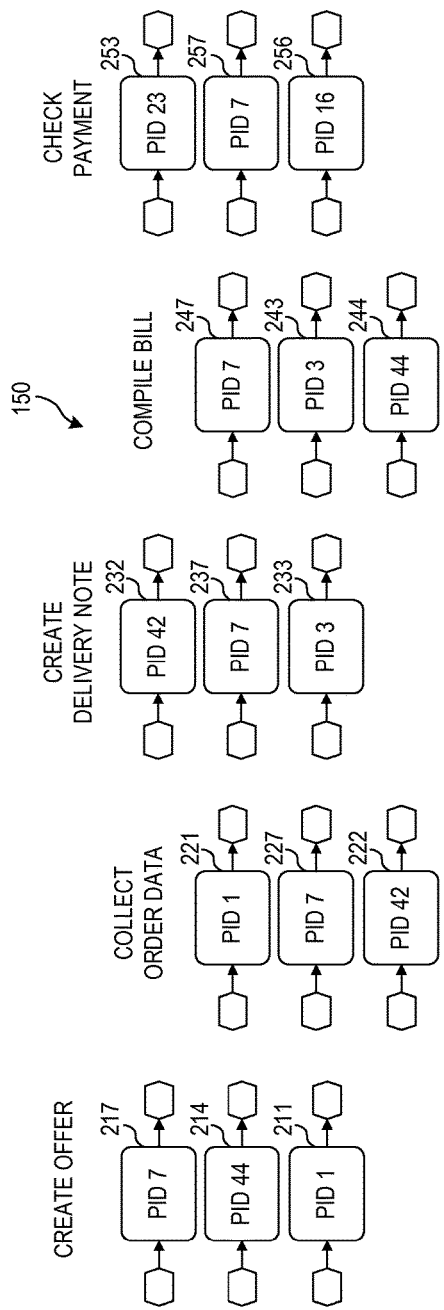
FIG. 2 is a diagram showing an exemplary makeup of the process step data of FIG. 1, according to a disclosed embodiment.
Figure 3:
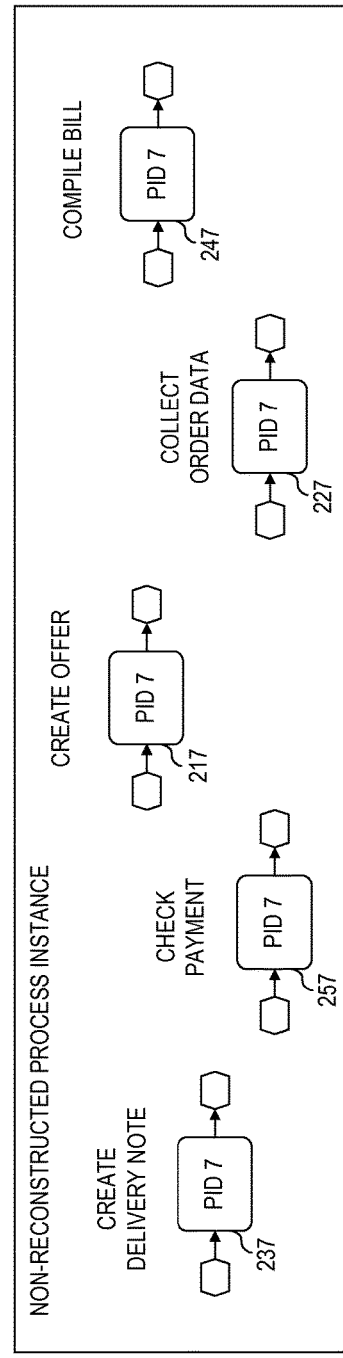
FIG. 3 is a block diagram showing a non-reconstructed process instance, according to disclosed embodiments.

After the process execution of creating the document data, steps can be performed to re-create the process instance, as shown with respect to FIGS. 2-4. The system accomplishes this by reading out the various documents 130-138 as process fragments that form process step data 150. Typically, however multiple process fragments will be loaded into the process step data 150 from multiple process instances, meaning related process fragments must be identified.

FIG. 2 is a diagram showing an exemplary makeup of the process step data 150 of FIG. 1, according to a disclosed embodiment. As shown in FIG. 2, the process step data 150 includes multiple process fragments associated with each step in the process. Each of these process fragments will be associated with a single process instance. Furthermore, each of these process fragments will also either have a process identifier (PID) identifying which process instance it should be associated with, or a reference to another process step of the process. The system can use either of these pieces of data to determine which process fragments belong to a single process instance FIG. 2 shows an embodiment using only PIDs. However, alternate embodiments could also employ references to other process fragments 200 in lieu of some or all of the PIDs.

The exemplary process step data 150 shows three process fragments associated with each of the five process steps. The step of creating an offer has three process fragments 211, 214, 217 associated with it; the step of collecting order data has three process fragments 221, 222, 227 associated with it; the create delivery note step has three process fragments 232, 233, 237 associated with it; the compile bill step has three process fragments 243, 244, 247 associated with it; and the check payment step has three process fragments 252, 256, 257 associated with it. For the purposes of simplicity, the process fragments may be referred to generically as process fragments 200. In alternate embodiments, each step in the process could have more or fewer process fragments 200 associated with it.

By looking at the associated PIDs, the system can identify which of the process fragments 200 in the process step data 150 are associated with a given process instance. For example, in FIG. 2, process fragments 217, 227, 237, 247, and 257 are all associated with the same process instance, which has a PID of 7. Thus, by reading this data out of the process step data 150, a user could identify all of the process fragments 200 associated with process instance 7.

Unfortunately, this data will come in no particular order. In other words, all the system will know is that each of these process fragments 200 is associated with a given process instance. It will have no information with respect to how process fragments 200 should be ordered together to reconstruct the process instance.

FIG. 3 is a block diagram showing a non-reconstructed process instance 310, according to disclosed embodiments. As shown in FIG. 3, the non-reconstructed process instance 310 includes process fragments 217, 227, 237, 247, 257, in no particular order. In order to reconstruct the process instance, the system must determine how the five process fragments 217, 227, 237, 247, 257 are connected to each other, i.e., in what order they should be connected.

FIG. 4 is a block diagram showing a reconstructed process instance 410, according to disclosed embodiments. As shown in the reconstruct process instance 410 of FIG. 4, the process fragment 217 associated with the step of creating an offer comes first, followed by the process fragment 227 associated with the step of collecting order data, followed by the process fragment 237 associated with the step of creating a delivery note, followed by the process fragment 247 associated with the step of compiling a bill, and finally followed by the process fragment 257 associated with the step of checking payment.

As noted above, the reconstruction of the process instance is a particularly difficult operation to perform. This is in part because the process fragments 200 may be stored in different formats, which may employ different criterions for identifying how a given process fragment 200 is associated to another process fragment 200 in the same process instance. However, this is an important operation to perform, because if the process instance can't be reconstructed, the amount of possible KPIs that can be generated is restricted. Furthermore, if the process instance is falsely reconstructed, the resulting KPIs will not be correct.

III. General Methods of Process Reconstruction

It is possible to use different methods for the recreation of a process instance. For example, recreation could be performed based on process templates; recreation could be based on a sort criterion; and recreation could be based on references.

a. Process Template Reconstruction

If process template reconstruction is to be used, all possible steps of the process and their connections have to be defined in advance. For example, the "model" or "workflow" of the "process type" has to be designed in a process design tool. Typical systems using this type of process instance recreation are workflow system, but other systems may be used, like the ProcessAnalyzer™ manufactured by QPR Software PLC.

The process template and every step have an identifier associated with them. If a process instance based on this process template is executed, the executed process instance has a reference to the process template and every executed step (i.e., the process fragment associated with that executed step) has a reference to the appropriate step in the process instance. For example, a fourth step in the process would generate a process fragment that identifies it as being associated with the fourth step. This is in addition to the PID that associates it with a given process instance.

If all of the process fragments employ the process template method of identification, reconstruction can be achieved by mapping each process fragment to a corresponding template step. For example if there are five process fragments 200, mapped to the template as step 4, step 2, step 5, step number one, step 3, respectively, the process fragment 200 associated with step 1 would be placed first, followed by the process fragment 200 associated with step 2, followed by the process fragment 200 associated with step 3, followed by the process fragment 200 associated with step 4, finally followed by the process fragment 200 associated with step criterion 5.

One example for a tool that uses this kind of process instance recreation is SAP Operational Process Intelligence, manufactured by SAP AG.

b. Sort Criterion Reconstruction

Some tools recreate a process instance using sorting based on a value that is available at every executed process steps. Example values could be a starting time stamp or a process step number, which is incremented every time when a process step is created. If two process steps have the same value for the sorting attribute they are either shown as parallel executed steps or a second value is used as a sort criterion for these steps with equal values.

If all of the process fragments employ the sort criterion method of identification, reconstruction can be achieved by placing the process fragments 200 in order based on the sort criterion.

Example tools that use this kind of process instance reconstruction are Process Performance Manager, manufactured by Software AG, and Fluxicon Disco, manufactured by Fluxicon.

c. Reference-Based Reconstruction

Some tools recreate the process instance using references to the direct predecessor or direct successor of a process step. If a predecessor reference is used, every executed process step (i.e., process fragment 200) stores a value (i.e., a unique ID) that references the predecessor step. Likewise, if a successor reference is used, every executed process step (i.e., process fragment 200) stores a value (i.e., a unique ID) that references the successor step.

If all of the process fragments employ the reference-based method of identification, reconstruction can be achieved by placing the process fragments 200 in order based on the predecessor or successor references. For example if there are five process fragments 200, process fragment A(C), process fragment B(-), process fragment C(E), process fragment D(A), and process fragment E(B) (where F(G) means process fragment F with predecessor fragment G), the fragments would be in the order of: process fragment B, followed by process fragment E, followed by process fragment C, followed by process fragment A, followed by process fragment D.

IV. Process Reconstruction in a Process Performance Manager

In order to be able to merge the imported fragments into complete process instances, information from the source system is required, which Process Performance Manager (PPM) uses to identify the process fragments 200 belonging to a given process instance, and to reconstruct the time sequence of the fragments 200 (i.e., the process logic).

The process reconstruction (sometimes called a process merge) runs in two stages, an external merge and an internal merge. In the external merge, all fragments belonging to a process instance are identified and collected into a non-reconstructed process instance. This can be referred to as a process merge. In the internal merge, the unlinked process fragments of the non-reconstructed process instance are linked to each other. This can be referred to as an event merge.

During the internal merge, PPM differentiates between two procedures: a merge based on reference keys (i.e., a key merge); and a merge based on sort order (i.e., a sort merge).

a. Merge Based on Reference Key (Key Merge)

A key-based merge is used to merge events with identical merge keys. Merge key rules are used to specify the attributes of a fragment event involved in the creation of the merge key. The merge key itself is created by combining the specified attribute values. All events with the same merge keys are merged into one event. Merge in this context means that two events are combined into one event containing the set union of the attributes of both events (if the same attribute exists on both events only one of the attribute values (depends on the configuration, e.g. the most recent one, will make it in to the new event). The new event will also have the set union of the connections of both initial events.

b. Merge Based on Sort Order (Sort Merge)

The merge based on sort order merges events based on particular sort criteria. Any number of sorting criteria can be specified in the form of function attribute types. The following event for a function (i.e., process fragment 200) is merged with the predecessor event of the following function.

By default, alphanumeric and chronological sorting procedures are implemented in PPM. The method used is specified by the data type of the specified sorting criterion.

An example of a sorting criterion could be the AT_END_TIME function attribute with the TIME data type.

In a merge based on sort order, the imported process fragments 200 of a given process instance may not contain rules. Process fragments 200 with sequential functions are divided into minimal event-driven process chains (EPCs), i.e., event-function-event.

c. Combining Merge Methods

In order to be able to merge process fragments 200 using different methods, multiple merge methods need to be defined. To do this, key and priority attributes are added to the merger configuration.

The value of the key attribute specifies the name of the merge method and is referenced by an AT_INTERNAL_EVENT_MERGE_MODE graph attribute for process fragments 200 to be imported. If process fragments 200 with different merge methods are merged during an import operation, the method with the lowest priority is used.

The default merge method is used for process fragments 200 for which the AT_INTERNAL_EVENT_MERGE_MODE attribute is not specified. The default method is the one that is defined in the merge configuration without specifying a key.

In PPM, combining merge methods is strongly discouraged since it is very restricted in usage and potentially leads to situations where the merge operation is not technically possible (e.g., an exit merge process with error messages).

V. Using Multiple Reconstruction Methods

As noted above, some processes will employ process fragments 200 using different formats, and which employ different merge methods. In order to be able to arrange the process steps as required in such process, each function is provided with one or more grouping attributes. This grouping is built up hierarchically. The grouping information can include multiple (hierarchical) parts. On a top level there is always a root group with an assigned merge method. Process steps without their own grouping information automatically belong to the root group as well as first-level groups. Below the root group any amount of groups can be configured, where each group is hierarchical, and in turn can have subgroups, and so on. Additionally all functions must provide information required by their associated merge methods. Both grouping and merging our defined in a group and merge configuration.

Figure 5:
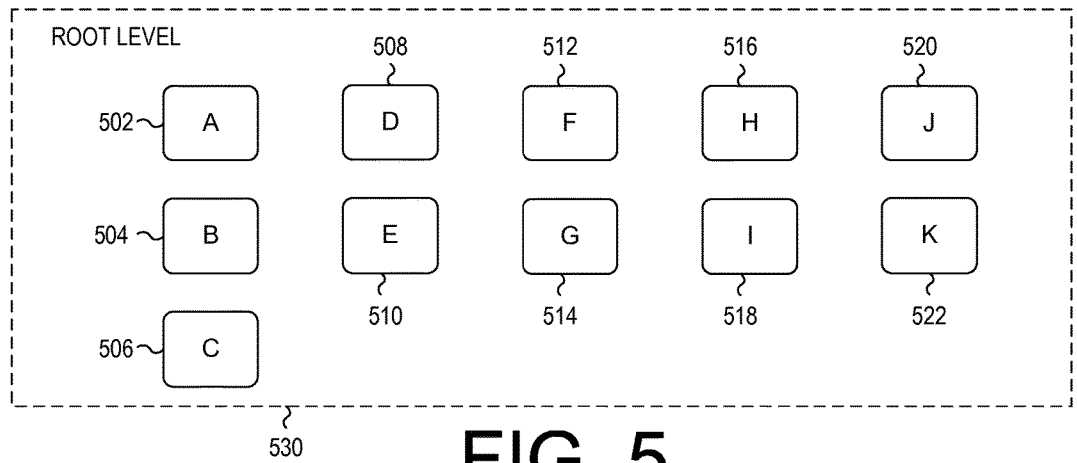
FIGS. 5-17 are block diagrams illustrating a process reconstruction operation using multiple reconstruction methods, according to disclosed embodiments.

Each group and merge configuration contains the following information: (1) an attribute to identify the membership of the group; (2) the merge method used for the group; (3) the information that is used for the merge on the next higher level group; and (4) how to find the information that is used for the merge on the next higher level group. The system will semi-automatically create/extend the group and merge configuration FIGS. 5-17 are block diagrams illustrating a process reconstruction operation using multiple reconstruction methods, according to disclosed embodiments. As shown in FIG. 5, at the root level 530, the disclosed process to be reconstructed includes eleven process fragments; process fragment A 502, process fragment B 504, process fragment C 506, process fragment D 508, process fragment E 510, process fragment F 512, process fragment G 514, process fragment H 516, process fragment I 518, process fragment J 520, and process fragment K 522. For the purposes of simplicity of disclosure, these process fragments may be referred to generically as process fragments 500. The process fragments 500 are initially contained at the root level 530 in no particular order and with no interconnection. It is necessary, therefore, to determine how the process fragments 500 will be connected to each other.

Each process fragment (i.e., process step or function) 500 includes an identifier as well as merge and grouping information. For the sake of simplicity this exemplary embodiment uses a single letter as the identifier for the process fragments 500. In alternate embodiments, a unique identifier (UID) or a document identifier could be used. In addition, integer values will represent a time value in this example. Alternate embodiments could have the time value provided in timestamp format.

In this exemplary embodiment all of the process fragments 500 belong to the same process instance. In other words, each process fragment 500 has one or more attributes that enable the system to identify them as process fragments 500 of the same process instance. For example, each of these process fragments 500 may have a process identifier (PID) that identifies which process instance it belongs to. It is assumed that at the start of the described process, the system has already gathered all of the process fragments 500 belonging to a given process instance from associated databases.

The process of the disclosed embodiment has three grouping attributes: country, city, and region, and uses both a sort merge and a key merge. The country group and the region group are both first-level groups, while the city group is a second-level group underneath the country group. The specific data contained in each process fragment 500 is shown below in table 1.

TABLE 1

| Process Fragment | Country, City | Region | Sort Merge Attribute | Key Merge Attribute |
|---|---|---|---|---|
| A | DE, SB | | 1 | |
| B | DE, SB | | 2 | |
| C | DE, SB | | 3 | |
| D | DE | | | C |
| E | DE | | | D |
| F | FR, Paris | | 4 | |
| G | FR, Paris | | 5 | |
| H | FR, Metz | | 6 | G |
| I | FR, Metz | | 7 | |
| J | | South | | |
| K | | South | 8 | J |

As shown in Table 1, each process fragment 500 has at least one first-level grouping attribute (either country or region), and at least one merge attribute (either a sort merge attribute or a key merge attribute). In addition, some of the process fragments 500 have a second-level grouping attribute (city). Furthermore, neither a sort merge attribute nor a key merge attribute is provided for every process fragment 500. As a result, multiple reconstruction methods must be used.

The method of arranging the process steps within the disclosed process instance uses the different merge methods and includes two steps: first grouping, and then merging. In the disclosed exemplary embodiment, the following hierarchical group and merge configuration is used:

1. Root group (default)
   Merge method: sort merge with root level merge attribute
   1.1. First-level group: country
      Merge method: key merge with first-level (country) merge attribute
      Determine merge attribute for next higher group: last occurrence of higher-level merge attribute (if available)
      1.1.1. Second-level group: city
         Merge method: sort merge with second-level (city) merge attribute
         Determine merge attribute for next higher group: last occurrence of higher-level merge attribute (if available)
   1.2. First-level group: region
      Merge method: key merge or with first-level (region) merge attribute
      Determine merge attribute for next higher group: last occurrence of higher-level merge attribute (if available)

For the sake of simplicity the disclosed embodiment uses only two different merge methods: key merge and sort merge. However, alternate embodiments could easily be extended to include other merge methods, e.g., the template method.

In the disclosed embodiment, the configuration is part of the system (i.e., PPM Customizing) and is stored as XML file in a database. The system (i.e., PPM) reads the configuration at start time. The system will then semi-automatically generate/extend the configuration during the creation of data sources in PPM.

a. Grouping

The root group is the top level group in a group and merge configuration. This means that all functions that belong to one process instance will first be grouped on the root level. FIG. 5 shows the resulting initial grouping.

Figure 6:
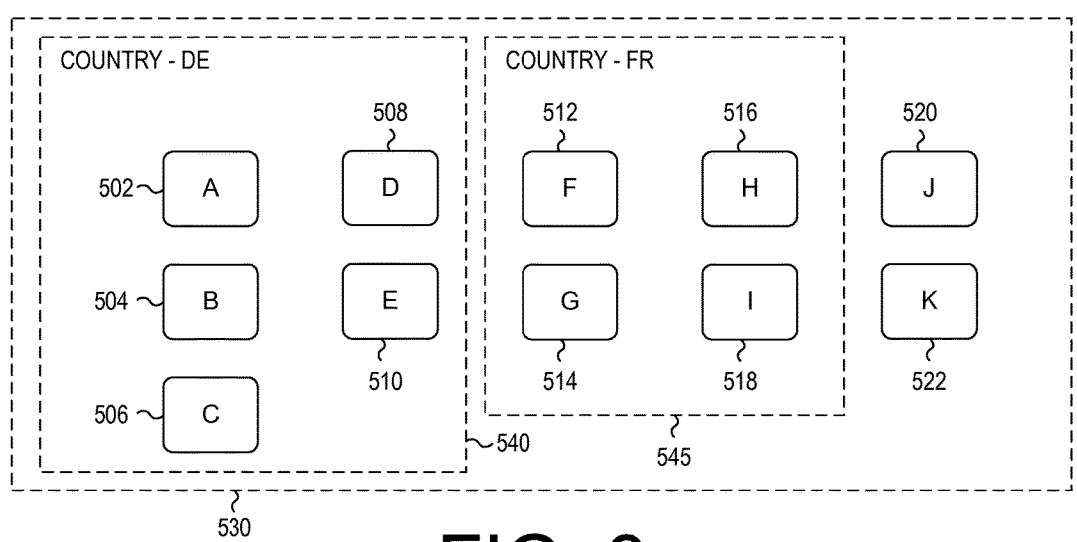

The first group on the next deeper level is the first-level group "country," according to the configuration. Based on the data contained in the process fragments 500, the process fragments A 502, B 504, C 506, D 508, and E 510 are grouped together into country "DE" 540, while the process fragments F 512, G 514, H 516, and I 518 are grouped together into country "FR" 545. FIG. 6 shows the resulting intermediate grouping.

Figure 7:
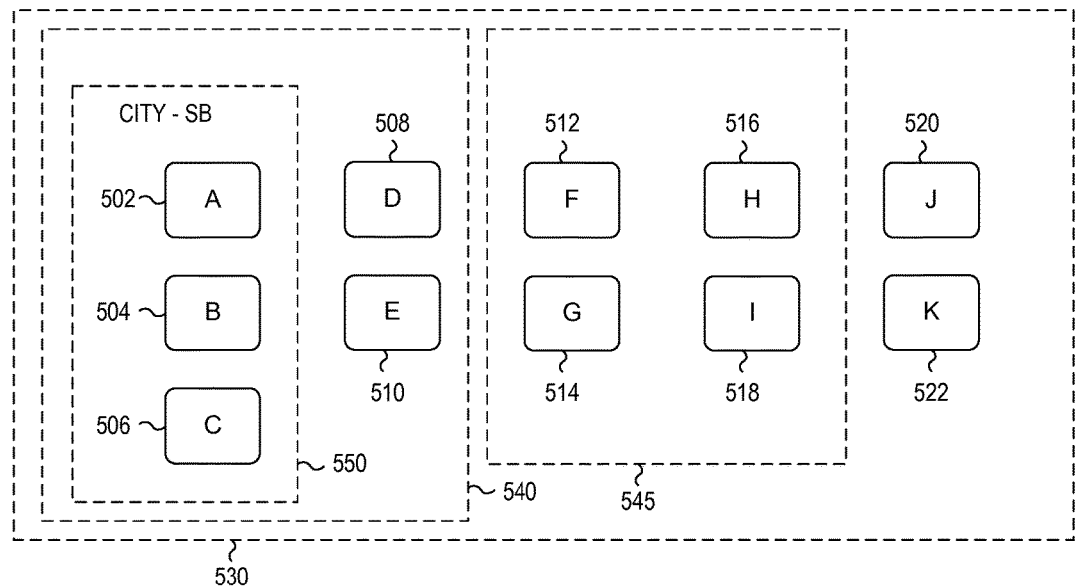

Next, the system applies the second-level grouping (subgroup "city") within the first-level group country DE 540. The process fragments A 502, B 504, and C 506 are grouped together into city "SB" 550. The functions D 508 and E 510 do not have any second-level grouping information. FIG. 7 shows the resulting intermediate grouping.

Figure 8:
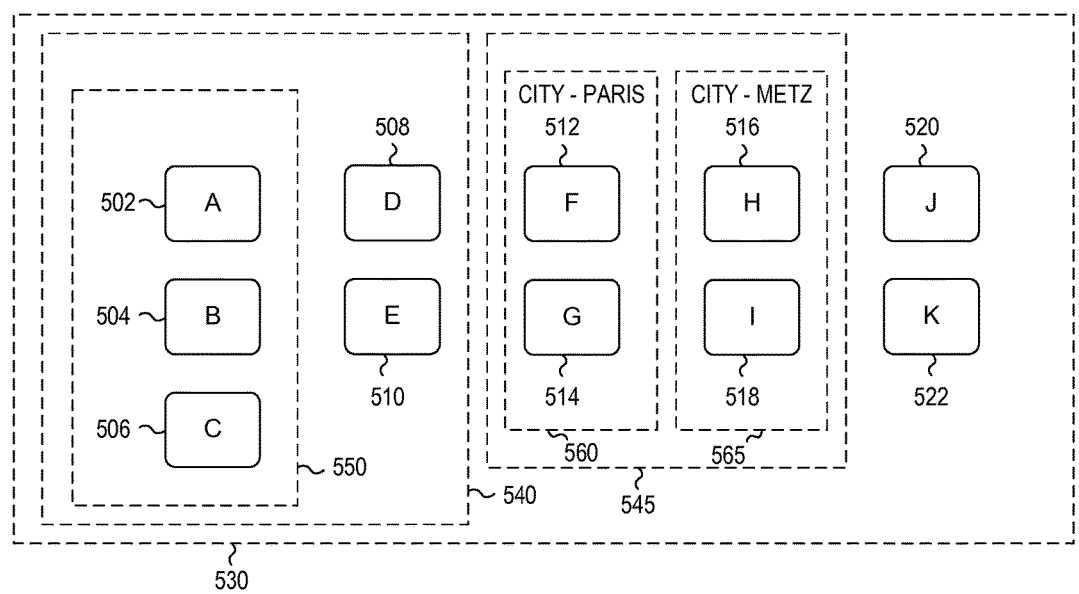

The system next applies the second-level grouping (subgroup "city") within the first-level group country FR 545. The process fragments F 512 and G 514 are grouped together into city "Paris" 560. The functions H and I are grouped together to city "Metz" 565. FIG. 8 shows the resulting intermediate grouping can be seen in FIG. 8.

Figure 9:
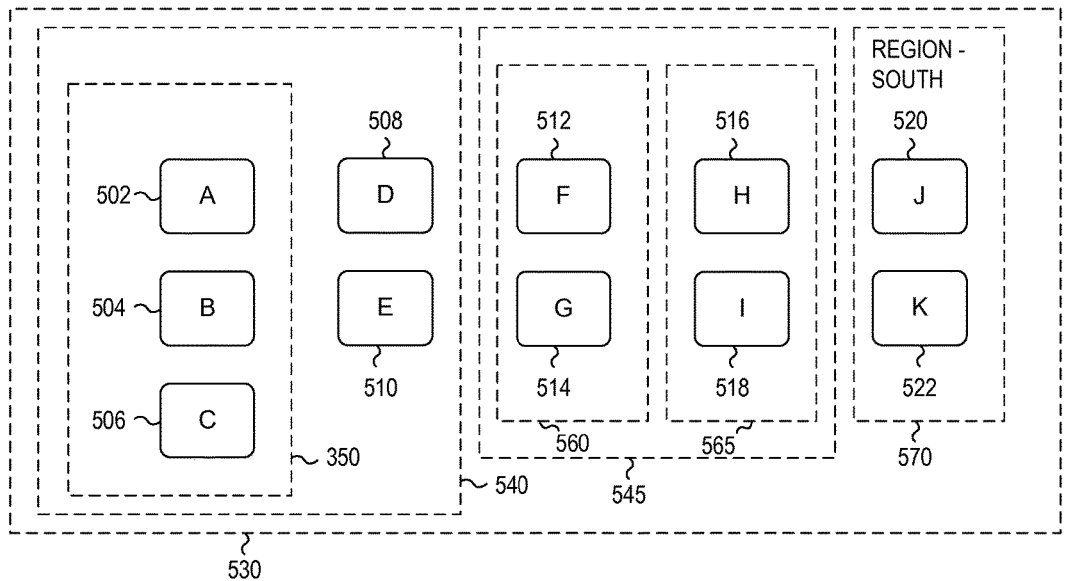

After finishing the grouping of the first-level group country and its sub group city, the system performs the grouping for the next first-level group region, again according to the provided configuration. In this operation, the process fragments J 520 and K 522 are grouped together to region "South" 570. FIG. 9 shows the resulting final grouping.

Figure 10:
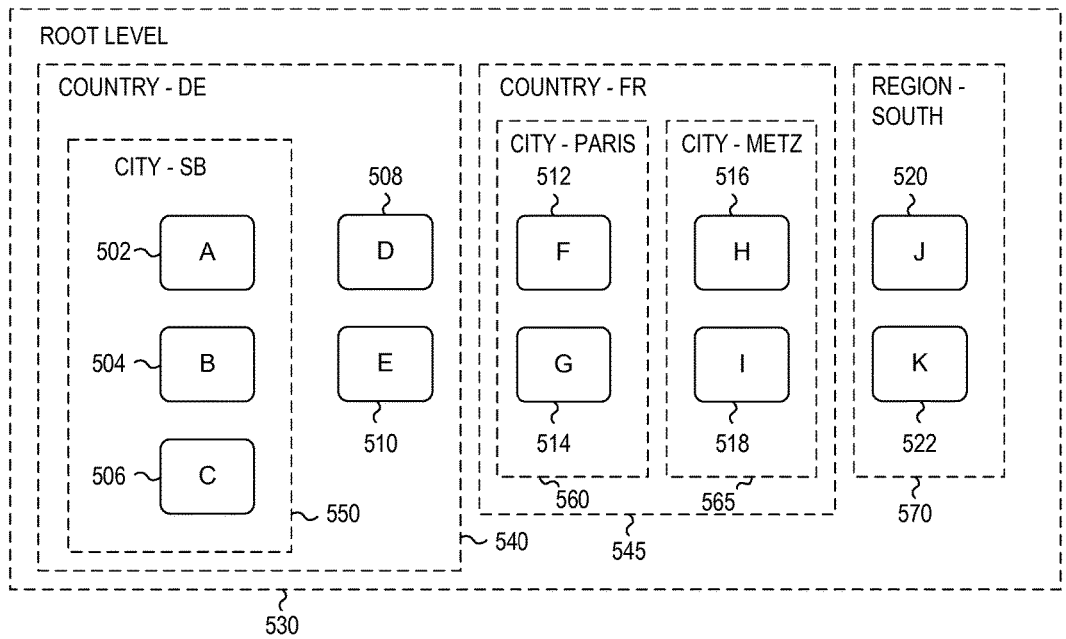

FIG. 10 also shows the final grouping of the process fragments 500, with labels provided for the root level and each group and subgroup.

b. Merging

After all of the functions are grouped, merging can begin. However, the sequence that the merging is performed is backwards to the order in which grouping was performed. In other words, merging is performed bottom-up instead of top-down. Whereas grouping must happen first on higher levels before grouping subgroups of a higher level group, merging must start in deeper groups, i.e. level n+1 groups must be merged on level n+1 before they can be merged as group in level n, and so on.

Therefore, the process begins merging in the last first-level group region. Since there is only one region, i.e. South 570, the process merges the two process fragments J 520 and K 522 in the region South 570. This merging is done using a key merge, since process fragment J 520 and process fragment K 522 are related by key merge. Specifically, process fragment K 522 indicates that process fragment J 520 is its predecessor. In other words, the key merge data for process fragments J 520 and K 522 is J(–), K(J) (where a predecessor process fragment 500 is listed in parentheses).

The higher-level merge attribute for this group is 8, since that is the sort merge attribute provided for the last process fragment 500 in this group, i.e., process fragment K 522.

Figure 11:
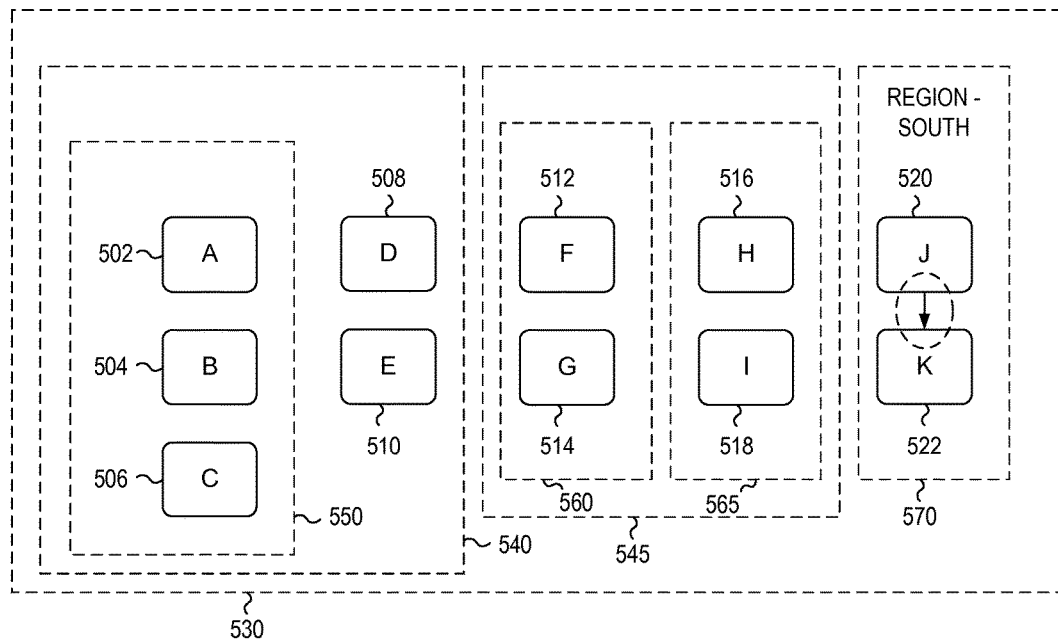

FIG. 11 shows the intermediate merging result after the first-level group South has been merged.

Next, the process merges the second-level subgroup city of the first-level group country FR 545, starting with the subgroup Metz 565, using sort merge. This merging is done using a sort merge, since process fragment H 516 and process fragment I 518 are related by sort merge. Specifically, process fragment H 516 has a timestamp 6, while process fragment I 518 has a timestamp 7. In other words, the sort merge data for process fragments H 516 and I 518 is H(6), I(7) (where a timestamp for the process fragments 516, 518 is listed in parentheses).

The higher level merge attribute for this group is G since that is the key merge attribute for the last occurrence in this subgroup (i.e., process fragment I 518).

The process continues merging the subgroup city of the first-level group country FR 545, by merging the subgroup Paris 560. This merging is also done using a sort merge, since process fragment F 512 and process fragment G 514 are related by sort merge. Specifically, process fragment F 512 has a timestamp 4, while process fragment G 514 has a timestamp 5. In other words, the sort merge data for process fragments F 512 and G 514 is F(4), G(5) (where a timestamp for the process fragments 512, 514 is listed in parentheses).

A higher-level merge attribute for this subgroup is not available, since neither of the process fragments in this subgroup (i.e., process fragment F 512 and G 514) has a key merge attribute associated with it.

Figure 12:
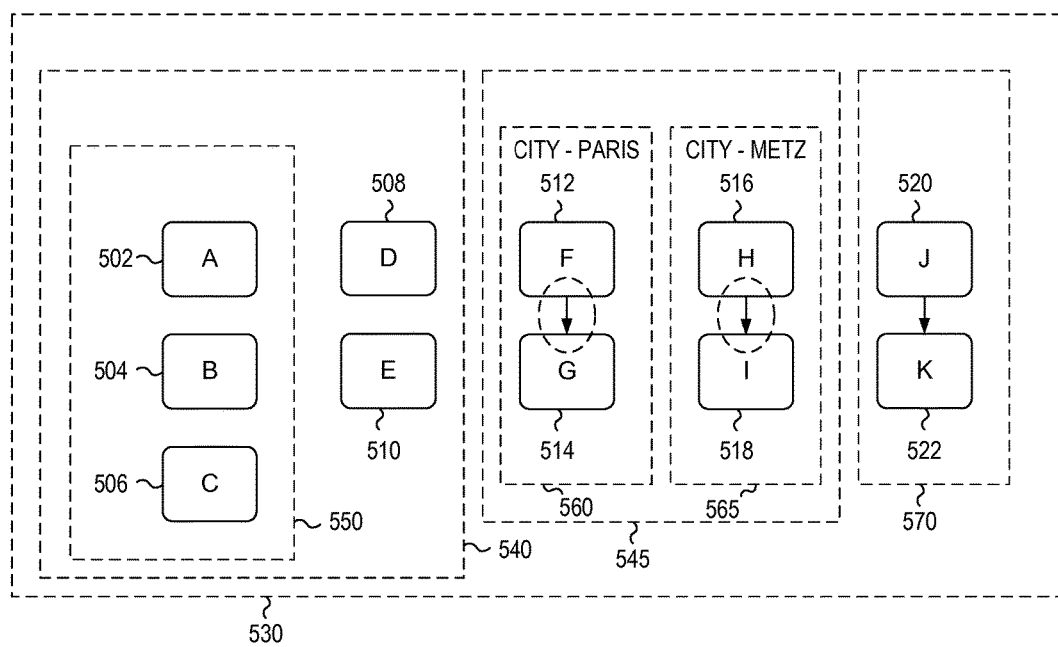

FIG. 12 shows the intermediate merging result after the second-level subgroups Metz and Paris have been merged.

Now, the process merges the first-level group country FR. This merging is done using a key merge, since the last process fragment 500 in the subgroup city Paris 560 (process fragment G 514) and the first process fragment 500 in the subgroup city Metz 565 (process fragment H 516) are related by key merge. Specifically, process fragment H 516 indicates that process fragment G 514 is its predecessor. In other words, the key merge data for process fragments G 514 and H 516 is G(–), H(G) (where a predecessor process fragment 500 is listed in parentheses).

The higher-level merge attribute for this group is 7, since that is the sort merge attribute provided for the last process fragment 500 in this group, i.e., process fragment I 518.

Figure 13:
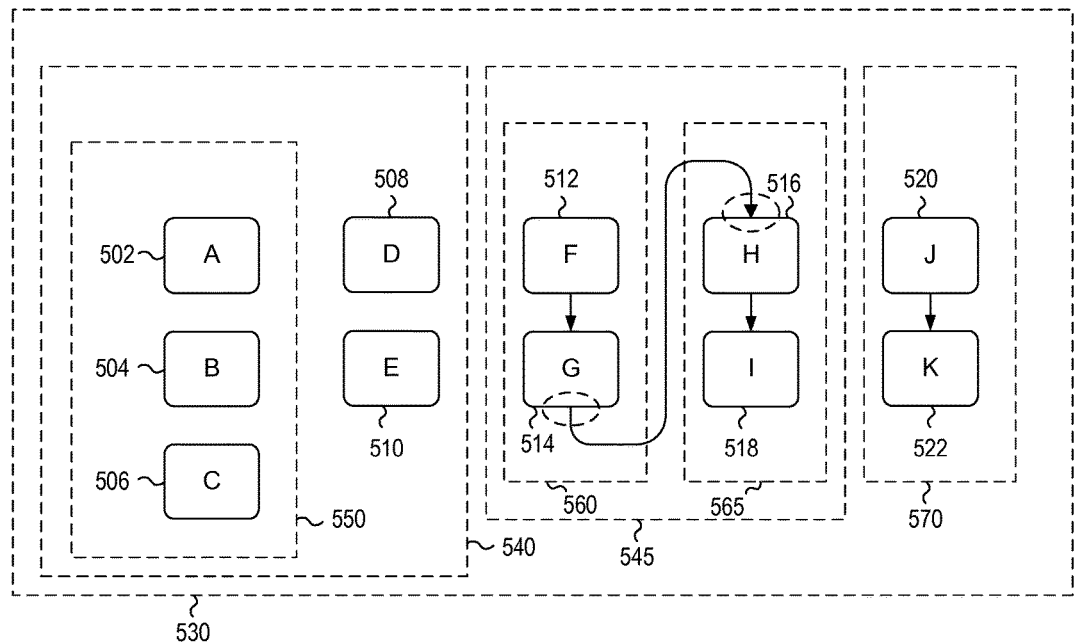

FIG. 13 shows the intermediate merging result after the first-level group FR 545 has been merged.

The process next merges the subgroup city SB 550 of the first-level group country DE 540. This merging is done using a sort merge, since process fragment A 502, process fragment B 504, and process fragment C 506 are related by sort merge. Specifically, process fragment A 502 has a timestamp 1, process fragment B 504 has a timestamp 2, and the process fragment C 506 has a timestamp 3. In other words, the sort merge data for process fragments A 502, B 504, and C 506 is A(1), B(2), C(3) (where a timestamp for the process fragments 502, 504, 506 is listed in parentheses).

A higher-level merge attribute for this subgroup is not available, since none of the process fragments in this subgroup (i.e., process fragments A 502, B 504, C 506) has a key merge attribute associated with it.

Figure 14:
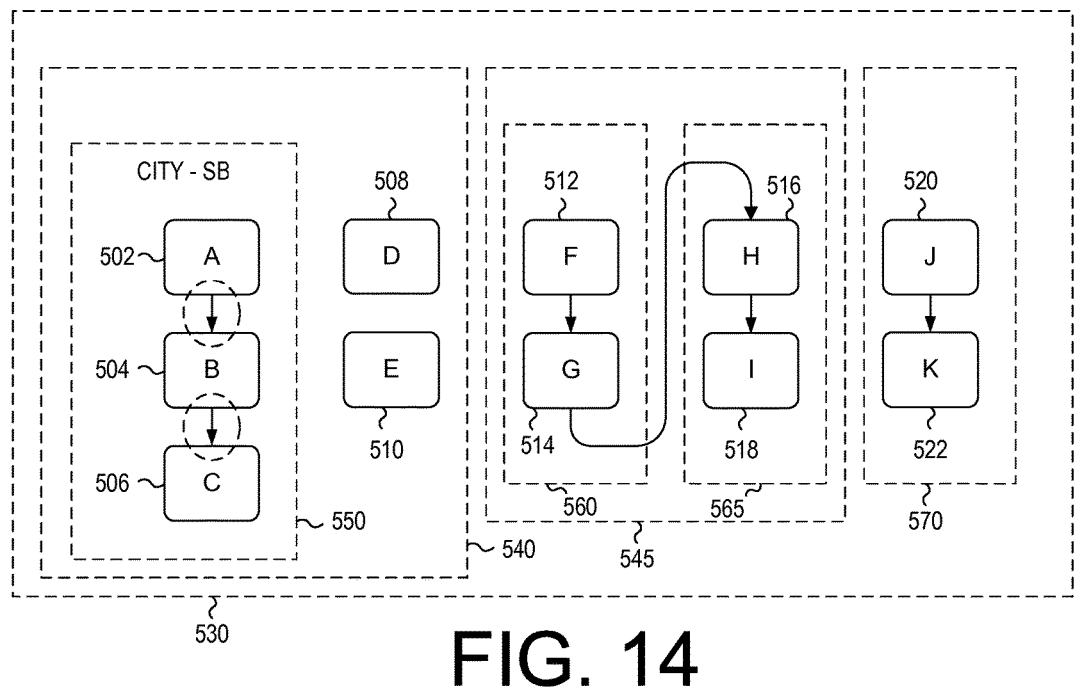

FIG. 14 shows the intermediate merging result after the second-level subgroup SB has been merged.

Now, the process merges the first-level group country DE. This merging is done using a key merge, since the last process fragment 500 in the subgroup city SB 550 (process fragment C 506), process fragment D 508, and process fragment E 510 are all related by key merge.

Specifically, process fragment D 508 indicates that process fragment C 506 is its predecessor, while process fragment E 510 indicates that process fragment D 508 is its predecessor. In other words, the key merge data for process fragments C 506, D 508, and E 510 is C(–), D(C), E(D) (where a predecessor process fragment 500 is listed in parentheses).

The higher-level merge attribute for this group is 3, since that is the sort merge attribute provided for the last process fragment 500 in this group with a sort merge attribute, i.e., process fragment C 506. On the level above, i.e. on the root level 530, the use of sort merge is configured. The higher-level merge attribute was taken from the last process fragment with a sort merge attribute. Because D 508 and E 510 do not have sort merge attributes, the higher level merge attribute was taken from process fragment C 506.

Figure 15:
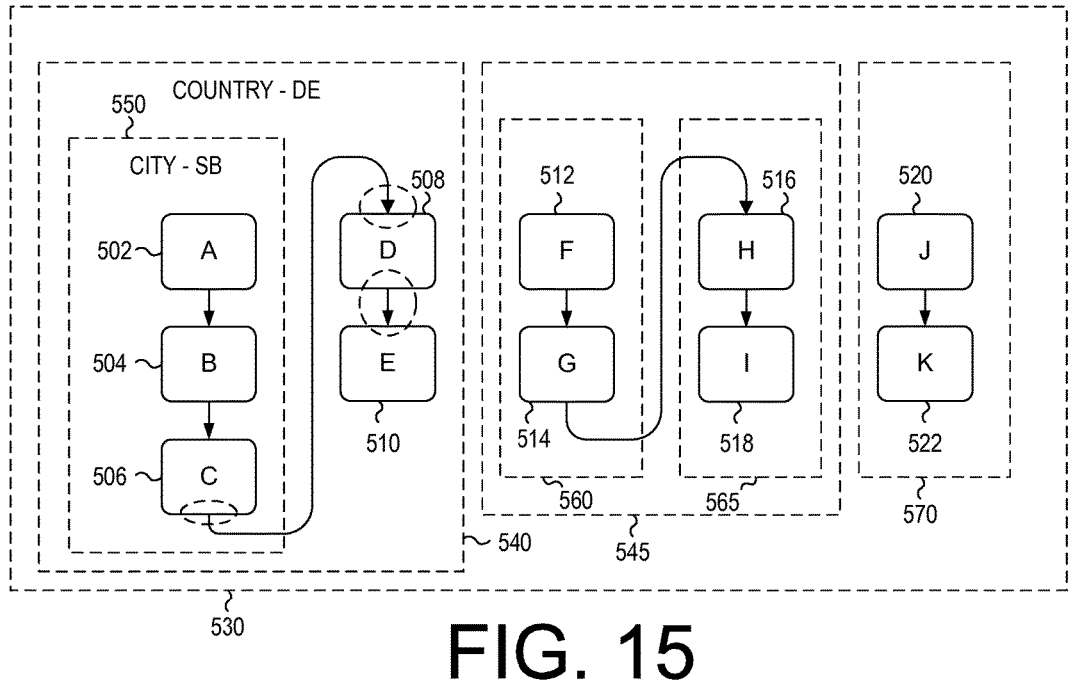

FIG. 15 shows the intermediate merging result after the first-level group de 540 has been merged.

Finally the process merges the root group 530. This merging is done using a sort merge, since the last process fragment in first-level group DE 540 with a sort merge attribute (process fragment C 506), the first process fragment in first-level group FR 545 (process fragment F 512), the last process fragment in first-level group FR 545 (process fragment I 518), and the first process fragment in first-level group South 550 with a sort merge attribute (process fragment K 522) are all related by sort merge. Specifically, process fragment C 506 has a timestamp 3, process fragment F 512 has a timestamp 4, process fragment I 518 is a timestamp 7, and process fragment K 522 has a timestamp 8. In other words, the sort merge data for process fragments C 506, F 512, I 518, and K 522 is C(3), F(4), I(7), K(8) (where a timestamp for the process fragments 506, 512, 518, 522 is listed in parentheses).

A higher-level merge attribute for this subgroup is not needed, since following this merge, the entire process will be reconstructed.

Figure 16:
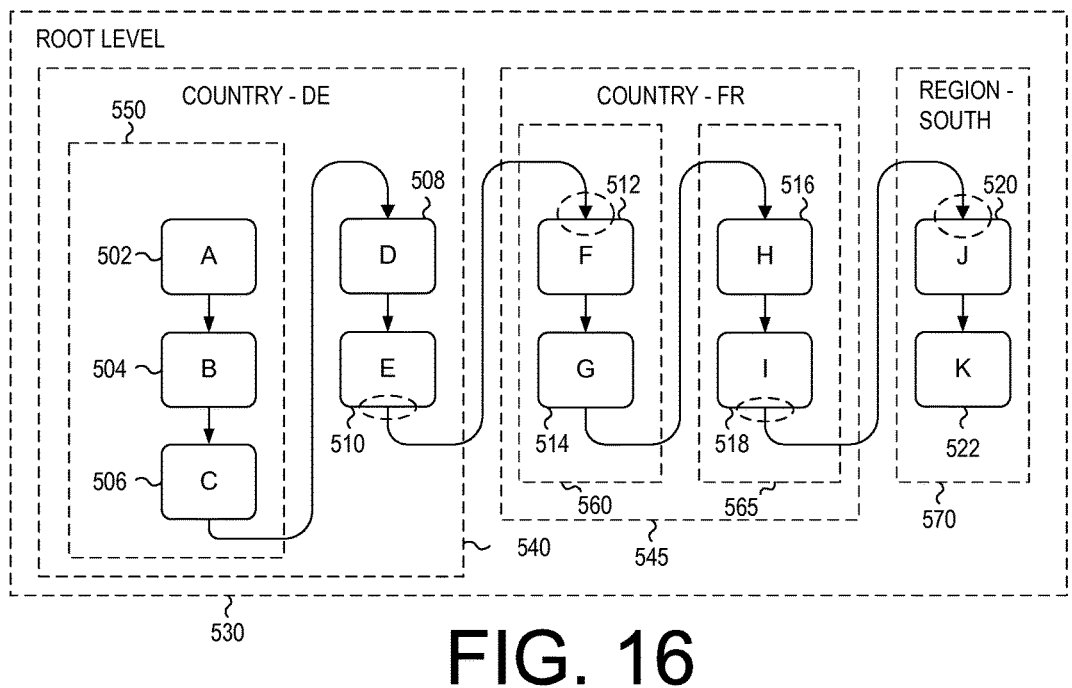

FIG. 16 shows the final merging result after the root level has been merged.

Figure 17:
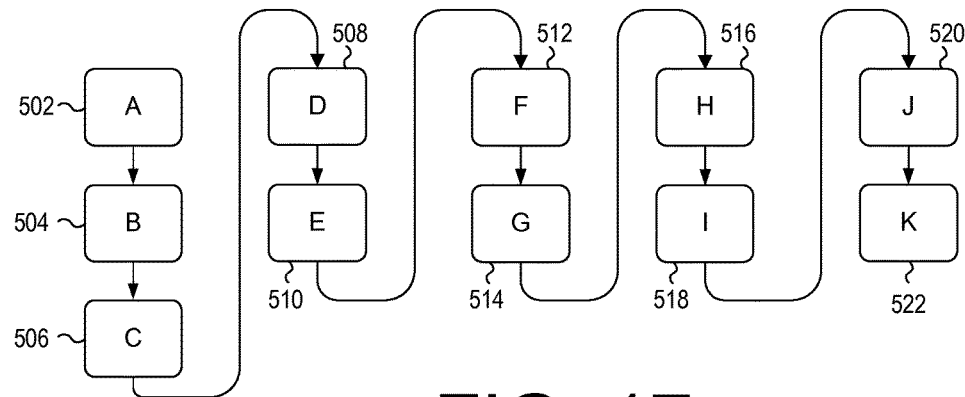

FIG. 17 also shows the final grouping of the process fragments 500, with no grouping labels. In other words, it simply shows the final, reconstructed process.

VI. Automatic Generation of Group and Merge Configuration in PPM

When performing process reconstruction, a heterogeneous mix of source systems may be consulted to obtain information regarding a single process instance. In PPM, a grouping and merging system usually extracts data from different source systems. For every source system one or more data sources are defined four data extraction. Currently for types of data sources are available in PPM: System Applications Products (SAP), Java Database Connectivity (JDBC), comma-separated values (CSV), and Universal Messaging (UM).

The differences between data sources have the consequence that a merge method X may be more suited to reconstruct processes from a source A than from a source B. Conversely, a merge method Y may be better suited to reconstruct a process from data out of a source B.

These merge method/data source type mappings can be collected, for example in a "default merge method" table (e.g., as part of a data source configuration), which should assist the system in creating the rules/configuration for process reconstruction.

While the data source type might be effectively used as an indicator for determining the correct merge method, the concrete data source from which the data originates may be used to establish the grouping criteria. Data provided by a specific source will probably be grouped together correctly. Incoming data from different sources would therefore result in different groups. As it can be observed, additional attributes found on the data sources can be used to group the functions in a more detailed way.

For example, it is possible to extend PPM to provide a default merge method for each data source type, e.g., key merge for SAP and CSV data sources, and sort merge for JDBC and UM data sources.

Currently PPM supports merge based on references (i.e., key merge) and merge based on a sort criterion (i.e., sort merge). However, the described process and system is not limited to these merging processes. Any other existing or future merging process could be used (e.g., merging based on process templates).

When creating a data source in PPM, the source system name/identifier (e.g., SAP_DE, SAP_FR, CSV_SOUTH) which is always available for a data sources is automatically used to define a first-level group for these data source. In the attribute mapping of the data source an attribute AT_<data source type>_SOURCE_SYSTEM_NAME is automatically added with the corresponding source system name (e.g., AT_SAP_SOURCE_SYSTEM="SAP_DE")

For each data source, the configured default merge mode for the data source type is used. The merge information must be available in the following attributes: AT_END_TIME for sort merge and AT_MERGE_REF for key merge. The user has to map these attributes with corresponding values.

By default, in the disclosed embodiment, the root group employs a sort merge with the sort order attribute AT_END_TIME.

For example, to illustrate the semi-automatically generation of the merge and group configuration, consider a system with three data sources: data source 1 SAP_DE (type SAP), data source 2 SAP_FR (type SAP), and data source 3 CSV_SOUTH (type CSV).

With respect to the data source SAP_DE (type SAP, i.e., key merge), automatic mapping or manual mapping can be employed. For automatic mapping, the data source SAP_DE has AT_SAP_SOURCE_SYSTEM_NAME="SAP_DE" for every process fragment 200, 500 (i.e., function). For manual mapping, the data source SAP_DE has AT_MERGE_REF with a reference ID/predecessor for every function, and AT_END_TIME with a time stamp associated with at least at one process fragment 200, 500 for root level merge.

With respect to data source SAP_FR (type SAP, i.e., key merge), automatic mapping or manual mapping can also be employed. For automatic mapping, the data source SAP_FR has AT_SAP_SOURCE_SYSTEM_NAME="SAP_FR" for every process fragment 200, 500 (i.e., function). For manual mapping, the data source SAP_FR has AT_MERGE_REF with a reference ID/predecessor for every function, and AT_END_TIME with a time stamp at least at one process fragment 200, 500 for root level merge.

With respect to data source CSV_SOUTH (type CSV, i.e., key merge), automatic mapping or manual mapping can also be employed. For automatic mapping, the data source CSV_SOUTH has AT_CSV_SOURCE_SYSTEM_NAME= "CSV_SOUTH" for every process fragment (i.e., function). For manual mapping, the data source CSV_SOUTH has AT_MERGE_REF with a reference ID/predecessor for every process fragment, and AT_END_TIME with a time stamp at least at one process fragment for root level merge.

When it automatically generates a group and merge configuration, the system starts by gathering information about the different data sources to generate the resulting group and merge configuration. In the disclosed embodiment, the result is an XML configuration file that may be either used immediately to run the grouping/merging or as a template to further refine the reconstruction. Thus, the group and merge configuration can be manually modified and extended at any time.

Listing 1 shows an example configuration file which illustrates a possible XML structure of the file.

Listing 1: Example configuration

```
<groupmergeconfig>
  <rootgroup>
    <description>root group</description>
    <merge method="SORTMERGE" attribute="AT_END_TIME">
  </rootgroup>
  <group level="1" id="1">
<description>group rule for first-level groups SAP_DE and
SAP_FR</description>
  <groupattribute>AT_SAP_SOURCE_SYSTEM_NAME</groupattribute>
    <merge methode="KEYMERGE" attribute="AT MERGE REF"
higherlevelattribute="AT_END_TIME" occurrence="LAST_FUCNTION">
  </group>
  <group level="1" id="2">
    <description>group rule for first-level group
CSV_SOUTH</description>
    <groupattribute>AT_CSV_SOURCE_SYSTEM_NAME</groupattribute>
    <merge methode="KEYMERGE" attribute="AT_MERGE_REF"
      higherlevelattribute="AT_END_TIME"
    occurrence="LAST_FUCNTION">
  </group>
  <group level="2" id="3" refid="1">
    <description>group rule for second-level groups for
    cities, e.g. Saarbrücken, Paris, ...</description>
    <groupattribute>AT_CITY</groupattribute>
    <merge methode="SORTMERGE" attribute=" AT_END_TIME"
      higherlevelattribute="AT_MERGE_REF"
    occurrence="LAST_FUCNTION">
  </group>
</groupmergeconfig>
```

In this example, in the configuration XML file, the groups with IDs 1 and 2 are generated automatically, while the group with ID 3 is added manually.

VII. System Architecture Overview

Figure 18:
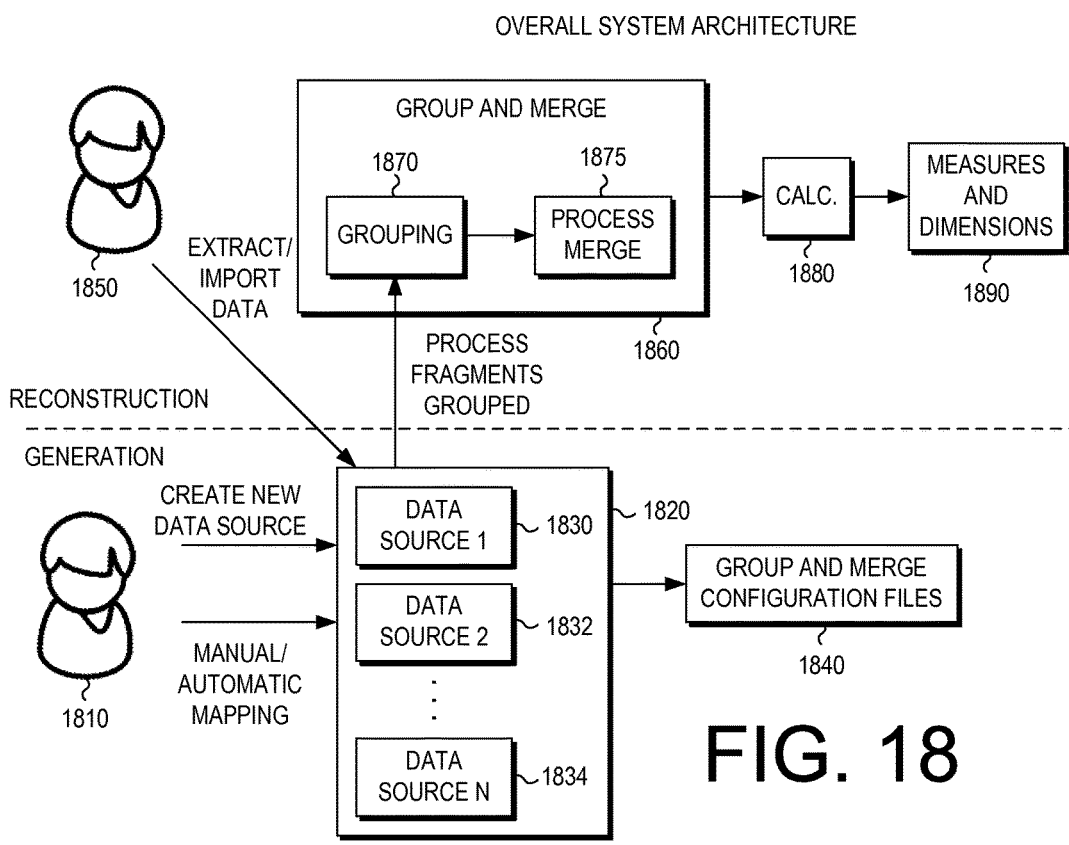
FIG. 18 is a block diagram showing the integration of the components "grouping and process merge" and "automatically generated group and merge configuration" in an extended system, according to disclosed embodiments.

FIG. 18 is a block diagram showing the integration of the components "grouping and process merge" and "automatically generated group and merge configuration" in an extended system, according to disclosed embodiments.

In operation, a first user 1810 creates one or more new data sources 1830, 1832, . . . , 1834 in a group of data sources 1820. This operation corresponds to a step in the PPM software which translates to creating a reference to a specific data source (e.g. SAP system, CSV storage, etc.). This step identifies the data source and its type.

The system then automatically generates/extends a group and merge configuration for the one or more data sources 1830, 1832, . . . , 1834 in the group of data sources 1820.

The first user 1810 can also perform a manual/automatic mapping of any necessary attributes. If the PPM software can identify a required system ID and system type attributes, these are mapped automatically. If not, these may need to be entered manually into the system. This mapping refers to the source itself, not to the data fragments that are processed to determine their place in the function chain.

A second user 1850 can then extract/import data from the one or more data sources 1830, 1832, . . . , 1834 in the group of data sources 1820.

When this happens, a grouping and merging process 1860 occurs, in which fragments are first grouped within one process instance 1870, and then merged within groups using the merge method of the respective group.

The system then calculates or measures KPIs and dimensions, and the user can analyze the EPCs.

VIII. Implementation

The more general implementation for applying the grouping and merging process to the process fragments 200, 500 is slightly different from the embodiment described above with respect to FIGS. 5-17. The embodiment described above was more sequential, because this was easier to understand than the recursive algorithm that would actually be used, and which combines the two components for grouping and merging.

a. Overview of Implementation

Figure 19:
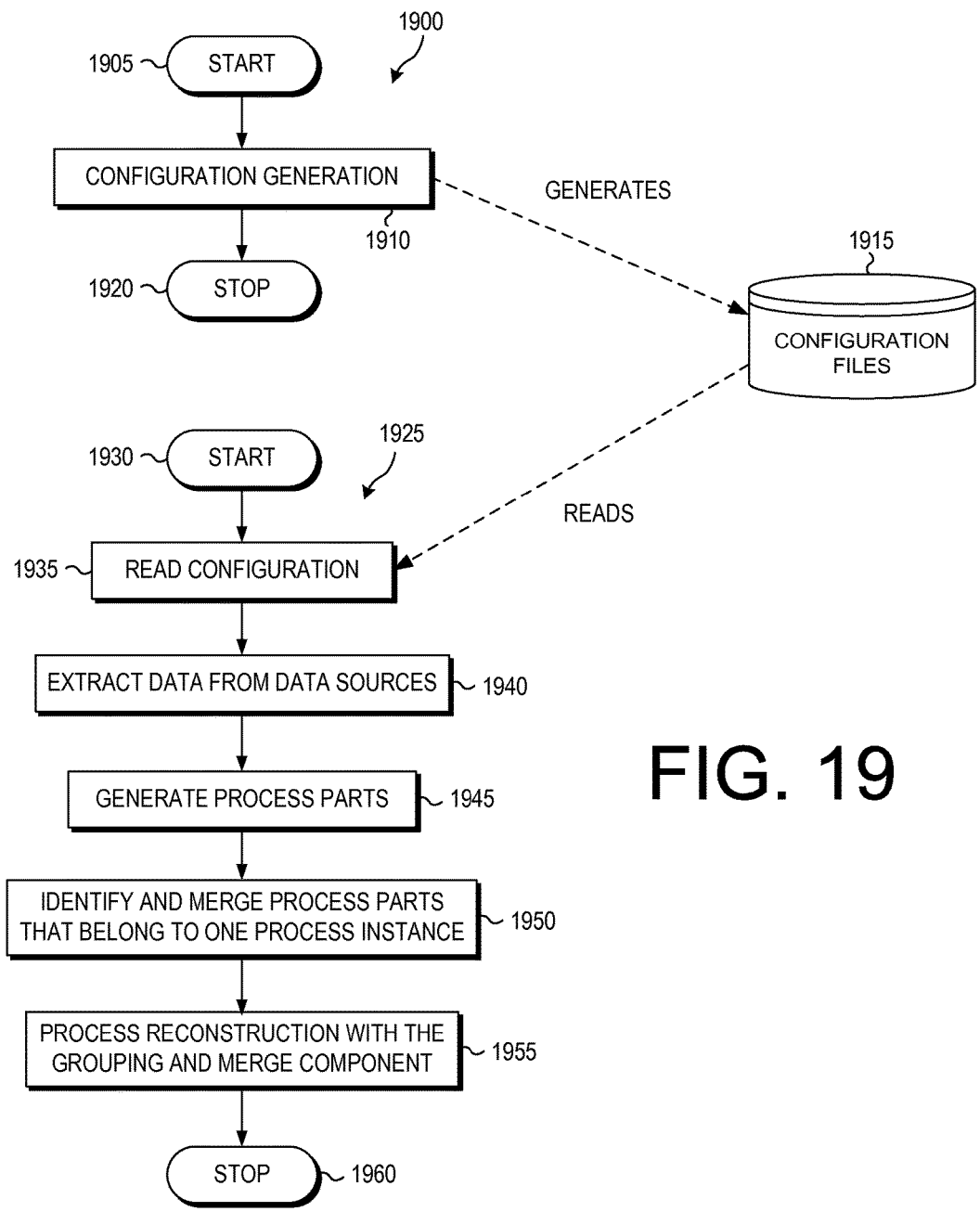
FIG. 19 is a flow chart showing an overview of a complete implementation of a process reconstruction system according to disclosed embodiments.

FIG. 19 is a flow chart 1900, 1925 showing an overview a complete implementation of a process reconstruction system according to disclosed embodiments. As shown in FIG. 19, a configuration process 1900 initially starts 1905, a group and merge configuration is generated 1910 and is sent to a configuration files database 1915, and the process stops 1920.

A reconstruction process 1925 then starts 1930, and begins by reading the group and merge configuration 1935 from the configuration files database 1915.

Data is then extracted from the data sources 1940, and this data is used to generate a set of process parts (i.e., a set of process fragments 200, 500) 1945.

The system then identifies and merges the processing parts that belong to one process instance 1950, and processes reconstruction with the grouping and merge component 1955. After this, the reconstruction process stops 1960

The group and merge configuration consists of an ordered list of rules, which can be hierarchically nested. The elements of a rule are described below. For rules with the same hierarchy level the order of the rules determines the processing sequence.

Every rule consists of three parts: (1) a grouping rule; (2) a merge rule; and (3) a calculation rule. In short, the grouping rule describes which attribute should be used for building blocks of process fragments 200, 500 (i.e., functions); the merge will describes how the process parts are merged to together; and the calculation rule describes how the information that is needed for the merge of the next higher rule level has to be determined. Calculation rules may be included automatically, e.g., to make use of the attribute AT_END_TIME of the latest function within a process fragment when sort merge is configured to be used on the next rule level, as given on root level. Alternatively, calculation rules can be defined by the user as needed to address process-specific calculations.

The rules can be hierarchical. For example, the list of rules might look as follows:

> Root rule
> •Rule 1
>   *Rule 1.1
>   *Rule 1.2
>     o Rule 1.2.1
> •Rule 2
> •Rule 3

The rules on the same hierarchy level will be applied one after another. If a rule has lower-level rules associated with it, the lower-level rules will be applied before the next rule on the same level will be applied. For example, the rules from the example above will be applied in the following order: root rule, rule 1, rule 1.1, rule 1.2, rule 1.2.1, rule 2, rule 3.

The grouping rule specifies an attribute of the process fragment 200, 500 that should be used for grouping the process fragments 200, 500, i.e., all process fragments 200, 500 with the same value will be added to the same group.

The merge rule specifies how the functions in one group should be merged, e.g., by a sort merge according to the values of an attribute, merged with references, or merged with a template.

The group attribute calculation rule describes how the attributes belonging to the whole group should be calculated. This rule consists of a calculation formula that describes how the attribute for the group should be calculated that is needed to be the merge rule at the level of the group.

b. Configuration Generation Operation

Figure 20:
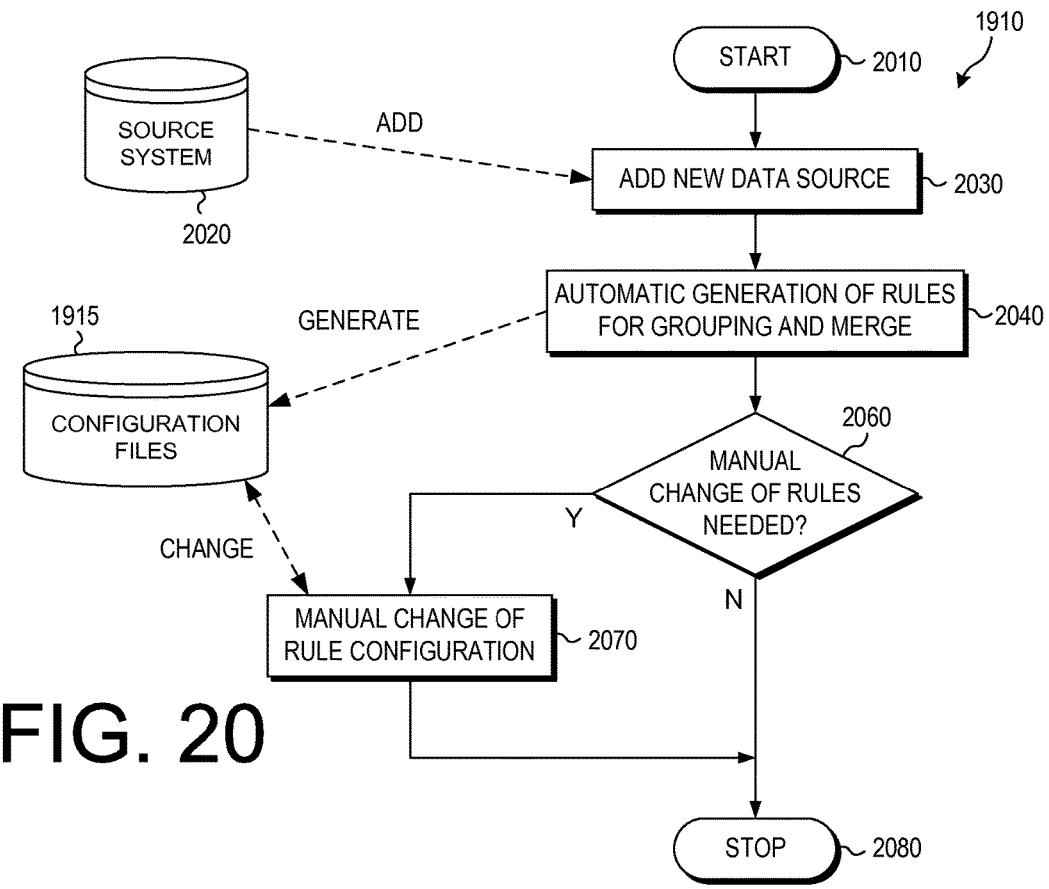
FIG. 20 is a flow chart illustrating the operation of configuration generation, according to disclosed embodiments.

FIG. 20 is a flow chart illustrating the operation of configuration generation 1910, according to disclosed embodiments. As shown in FIG. 20, the configuration generation operation 1910 starts 2010 and proceeds to add a new data source 2030 from a source system database 2020.

The system then automatically generates rules for grouping and merging 2040 and sends them to the configuration files database 1915.

Next, the system determines whether any manual changes of rules are needed 2060. If no manual changes are needed, the configuration operation 1910 stops 2080.

If, however manual changes of the rules are needed, these manual changes are made 2070 and stored in the configuration files database 1915. Following these manual changes, the configuration operation 1910 then stops.

c. Process Reconstruction Operation

Figure 21:
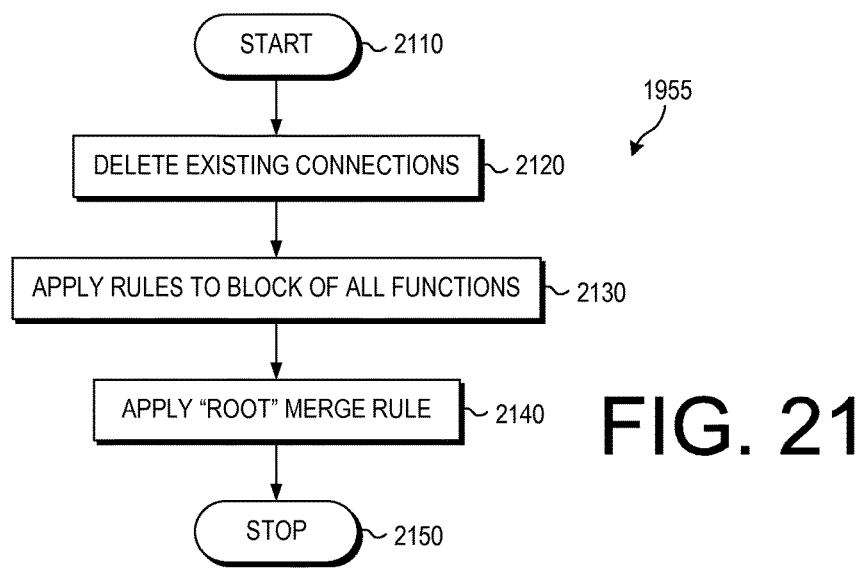
FIG. 21 is a flow chart illustrating the operation of process reconstruction, according to disclosed embodiments.

FIG. 21 is a flow chart illustrating the operation of process reconstruction 1955, according to disclosed embodiments. As shown in FIG. 21, the process reconstruction operation 1955 starts 2110, and begins by deleting all existing connections 2120.

The system then applies the grouping and merging rules to all of the process parts (i.e., process fragments or functions) 2130.

Finally, the system applies the root merger rule to complete the reconstruction process 2140. At this point, the process reconstruction operation 1955 stops 2150.

An exemplary pseudocode implementation of the process reconstruction operation 1955 is shown in listing 2.

Listing 2; Example Reconstruction Operation

```
reconstructProcess(process) {
    deleteExistingConnections(process);
    rootBlock = getAllfunctions(process);
    // the first-level below root is level 1
    applyRules(1, rootBlock);
    applyMergeRule(firstBlock, rootMergeRule);
}
```

As shown in this pseudocode, first the connections between the functions from older merges are removed and all process fragments 200, 500 (i.e., functions) are added to the root block, i.e., all functions of the process. Then the rules are applied recursively for the process fragments 200, 500 in the root block. After applying all of these rules, the root merge rule is applied.

d. Apply Rules Operation

The pseudocode for the method "applyRules" that applies all rules of a specific level to a block of functions is described below in listing 3. This method is first called for the root block with all functions (i.e., process fragments 200, 500) and "1" as the current rule level and then applies all rules by calling itself recursively. If this method returns, all rules at the given level have been applied to the given block of functions.

Figure 22:
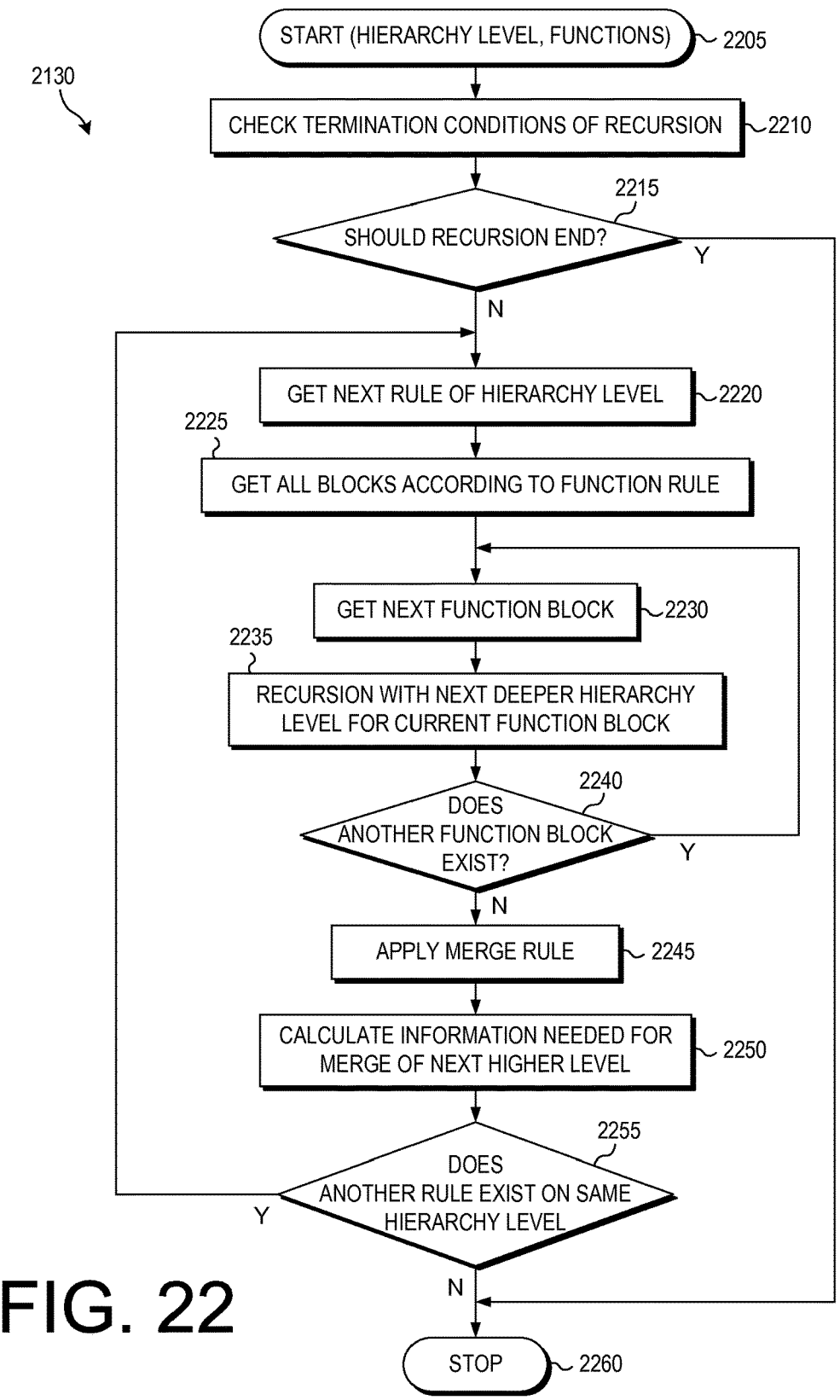
FIG. 22 is a flow chart showing the operation of applying rules, according to disclosed embodiments.

FIG. 22 is a flow chart showing the operation of applying rules 2130, according to disclosed embodiments. As shown in FIG. 22, the process starts 2205 by applying to the functions in a given hierarchy level.

The system first checks the termination conditions of recursion 2210, and then decides, based on this check, whether recursion should and 2215.

In the disclosed embodiment, if the apply rules method is entered, first the two termination conditions for the recursion are checked. i.e., the recursion ends if only one or zero functions are contained in the block, or if no rule exists at the current level that could be applied.

After that the process must have at least two functions and at least one rule that has to be applied.

If the system determines that recursion should end, then it immediately stops 2260 the operation of applying rules 2130.

If, however the system determines that recursion should not end, it gets the next rule of the current hierarchy level 2220, gets all of the blocks associated with that function rule 2225, and then gets the next function block (i.e., process fragment 200, 500) for all the blocks associated with the function rule 2230.

The system then performs recursion with the next deeper hierarchy level for the current function block 2235, and determines whether another function block exists in the set of blocks associated with the current function rule 2240.

If another function block does exist, the process obtains the next function block 2230, and continues processing from there.

If no other function block exists, the process applies the appropriate merge rule 2245 and then calculates the information needed for the merge of the next higher level 2250.

Finally, the system determines whether another rule exists on the same hierarchy level 2255. If another rule does exist, the system gets the next rule of the hierarchy level 2220, and continues processing from there.

If no other rule exists on the same hierarchy level, processing of the operation of applying rules 2130 stops 2260.

In this way, the system iterates over all of the existing rules. It takes the first rule and applies the ordering part of the rule to get a list of blocks of functions (i.e., process fragments 200, 500). All functions that are added to a group are removed from the list of functions that have no group.

The system then iterates over these blocks of functions.

In doing so, it takes the first block and applies all rules of the next lower hierarchy level to this block. If the recursive call returns, all functions of this block are merged, i.e. this part or the process is reconstructed and the information needed for the merge of this group with the other groups of the current level is calculated.

If this recursive method call was done for all blocks of functions, these blocks can be merged together by applying the merge rule of the current level and then the calculation of the information needed for the next higher merge rule can be done.

If all functions are added to a group, it is possible to return, even if there are more rules at the same hierarchy level.

An exemplary pseudocode implementation of the operation of applying rules 2130 is shown in listing 3.

Listing 3: Example Apply Rules Operation

```
applyRules(currentRuleLevel, functionsInBlock) {
    // if a block contains less than 2 function, nothing has to be merged
    if (numberOfFunctions(functionsInBlock) < 2)
        return;
    // return if no rule exists on current level
    if (numberOfRulesAtLevel(currentRuleLevel) == 0)
        return;
    notGroupedFunctions = functionsInBlock;
    // iterate over the rules of current level
    for (currentRule : rulesAtLevel(currentRuleLevel)) {
        // group the functions according the grouping rule
        functionBlocks = applyGroupingRule(currentRule,
                                    notGroupedFunctions);
        // iterate over the grouped blocks of functions
        for(currentFunctionBlock : functionBlocks) {
            applyrules(currentRuleLevel + 1,
        currentFunctionBlock) ;
        }
        applyMergeRule(currentFunctionBlock, currentRule);
        applyBlockCalculationRule(currentFunctionBlock,
    currentRule);
        if (notGroupedFunctions.size( ) == 0) return;
    }
}
```

IX. Glossary

Terms as used herein are intended to be interpreted first, as understood to one of skill in the art at a first-level, of business process management software; and if not interpretable at the first-level, then at a second-level as understood to one of skill in the art of computer science and information science; and then if not interpretable according to the first-level and second-level, according to a more general dictionary.

The claims may use the following terms, which are defined to have the following meanings for the purpose of the claims herein. Other definitions may be specified in this document.

The phrase "automatically without manual intervention," when used in a claim, is defined to mean that the particular step occurs after the step is initiated until limitations recited in the step are finished without requiring a user to provide input to a processor.

The term "computer system," "computer," or a "system" used herein denotes a device sometimes referred to as a computer, laptop, personal computer, personal digital assistant, notebook computer, personal assignment pad, server, client, mainframe computer, or evolutions and equivalents thereof, unless further limited by context or by express statements.

The term "key merge" used herein denotes a process merge by which elements are ordered according to which of a series of sequential keys the elements are associated with.

The term "process fragment" used herein denotes a single document memorializing a single step within a larger process. This is a minimal part of a process, which could e.g. be a "function" of a "function with a start and end event" in EPCs.

The term "process instance" used herein denotes a single occurrence, from start to finish, of a known process.

The term "process merge" used herein denotes a process by which individual process fragments are ordered with respect to each other.

The term "sort merge" used herein denotes a process merge by which elements are ordered according to information associated with the elements regarding an immediate predecessor or an immediate successor to the element.

The terms "process fragment," "function," and "process step" should be considered equivalent for the purposes of this disclosure.

The terms "process merge" and "process reconstruction" should be considered equivalent for the purposes of this disclosure.

X. Implementation and Technical Notes

The above discussion has assumed that the reader has a sufficient technical background for appreciating the points made. This section provides some supplementary implementation and/or technical notes which discuss some technical information that may be relevant.

This discussion has involved particular examples. However, the principles may be applied to other examples and/or realizations. Naturally, the relevant data may differ, as appropriate; and/or the code may be adapted to different realizations. Further, an embodiment may be used by numerous users, if preferred, and/or can be provided and/or accessed over distributed systems.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or one or more integrated circuits (ICs), such as a central processing unit (CPU) which is the hardware that carries out instructions of a computer program, and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation.

Therefore, in the interest of brevity and minimization of any risk of obscuring principles and concepts, further discussion of such software and ICs, if any, will be limited to the essentials with respect to the principles and concepts used by the exemplary embodiments.

The various embodiments which demonstrate a method and/or system for process reconstruction have been discussed in detail above. It should be further noted that the above-described processes can be stored as instructions in computer-readable storage medium. When the instructions are executed by a computer, for example after being loaded from a computer-readable storage medium, the process(es) are performed.

The detailed descriptions, which appear herein, may be presented in terms of program procedures executed on a computer or a network of computers. These procedural descriptions and representations herein are the means used by those skilled in the art to most effectively convey the substance of their work to others skilled in the art.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

A computer-readable storage medium is tangible and non-transitory; a computer-readable storage medium can be any of the memory or storage devices, such as those examples described above, or other removable or fixed storage medium, provided such computer-readable storage medium is tangible and non-transitory.

Furthermore, any communication network implicated in an embodiment can include, by way of example but not limitation, data and/or packet communications networks, which can provide wireless communications capability and/or utilize wireline connections such as cable and/or a connector, or similar. Any appropriate communication protocol may be used.

The computer and/or system embodied in connection herewith may (or may not) rely on the integration of various components including, as appropriate and/or if desired, by way of example but not limitation, hardware and software servers, applications software, database engines, server area networks, firewall and SSL security, production back-up systems, and/or applications interface software. An embodiment may be, by way of example but not by way of limitation, network-based and may (or may not) utilize a network such as the Internet or other network as an exemplary interface with the user for any information delivery.

One or more databases implicated by the above discussion may be, by way of example but not limitation, in a relational database format, but other standard data formats may also be used. Optionally, the various databases may include a known conversion system capable of receiving data in various standard formats.

Further, an embodiment has been discussed in certain examples as if it is made available by a provider to a single customer with a single site. An embodiment may be used by numerous users, if preferred, and the users can be at one or more sites.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for process reconstruction, the method comprising:

extracting a plurality of system type attributes and a plurality of associated system identification attributes from a plurality of pieces of data generated by a plurality of process fragments, respectively, produced on a heterogeneous mix of a plurality of different systems and a plurality of different system types, each of the system type attributes containing information identifying a type of a system that generated the data, and each of the system identification attributes containing information identifying the system that generated the data, wherein each of the process fragments is represented by data generated during execution of a step by a process instance;

extracting a process identification attribute from the plurality of pieces of data generated by the plurality of process fragments, respectively, the process identification attribute identifying the plurality of pieces of data as belonging to a same process instance;

determining a hierarchy of functions within the same process instance based on a grouping operation, the hierarchy being based on the plurality of system type attributes and the plurality of system identification attributes of the plurality of different systems on which the same process instance was executed, wherein the grouping operation groups together in the hierarchy each of the process fragments which have a same system-type-attribute-and-system-identifier-attribute, wherein the process fragments in one grouping have the same system-type-attribute-and-system-identifier-attribute and belong to the same process instance;

generating a configuration file for applying a plurality of different reconstruction methods, the configuration file being set to selectively apply each of the reconstruction methods based on the hierarchy of functions and a predetermined mapping table, the mapping table pairing the system-type-attribute-and-system-identifier-attribute of the plurality of different systems and the respective different reconstruction methods;

applying the respective different reconstruction methods to the plurality of pieces of data generated by the process fragments in accordance with the configuration file, to reconstruct the same process instance, as a reconstructed process instance, with the process fragments merged with functions in sequential order of a process flow of the same process instance, wherein (i) a type of reconstruction method is applied to the process fragments in each of the one grouping and thus a system particular sequence of the process fragments within the one grouping is correct for a particular system and system attribute, and then (ii) a sequence of reconstruction of the process fragments of the same process instance across the heterogeneous mix of the plurality of different systems and the plurality of different system types is applied based on the hierarchy; and providing the reconstructed process instance which represents all process fragments in correct sequence produced by the same process instance on the heterogeneous mix of the plurality of different systems and the plurality of different system types;

further comprising, for the same process instance: first performing the grouping operation top down in the hierarchy of functions starting at a root of the hierarchy, and then performing the applying of the respective different reconstruction methods bottom up in the hierarchy of functions starting at a lowest level of the hierarchy; and determining performance of a process using at least the reconstructed process instance.

2. The method for process reconstruction of claim 1, wherein the reconstruction methods include at least one of a sort merge, a key merge, and a process template merge.

3. The method for process reconstruction of claim 1, wherein the grouping operation further comprises performing a first grouping operation of a plurality of functions stored in one or more memory modules to extract an unsorted first group of functions from the one or more memory modules based on the process identification attribute;

performing a second grouping operation on the unsorted first group of functions to extract an unsorted second group of functions from the unsorted first group of functions based on a first first-level grouping attribute; and performing a third grouping operation on the unsorted first group of functions to extract an unsorted third group of functions from the unsorted first group of functions based on the first first-level grouping attribute.

4. The method for process reconstruction of claim 3, wherein the configuration file is configured to apply a third reconstruction method to the unsorted third group of functions based on one or more third merging attributes contained in the unsorted third group of functions to generate a sorted third group of functions, apply a second reconstruction method to the unsorted second group of functions based on one or more second merging attributes contained in the unsorted second group of functions to generate a sorted second group of functions, and apply a first reconstruction method to the sorted second and third groups of functions based on one or more first merging attributes contained in the sorted second and third groups of functions to generate a sorted first group of functions, and the first merging attributes, the second merging attributes, and the third merging attributes include at least two different types of merging attributes.

5. The method for process reconstruction of claim 4, wherein the at least two different types of merging attributes include integer time stamp merging attributes and predecessor reference merging attributes.

6. The method for process reconstruction of claim 4, wherein the grouping operation further comprises performing a fourth grouping operation on the unsorted first group of functions to extract an unsorted fourth group of functions from the unsorted first group of functions based on a second first-level grouping attribute; and the configuration file is further configured to apply a fourth reconstruction method to the unsorted fourth group of functions based on one or more fourth merging attributes contained in the unsorted fourth group of functions to generate a sorted fourth group of functions, and the fourth reconstruction method is applied to the sorted second, third, and fourth groups of functions based on one or more first merging attributes contained in the sorted second, third, and fourth groups of functions to generate the sorted first group of functions.

7. The method for process reconstruction of claim 4, wherein the grouping operation further comprises performing a fifth grouping operation on the unsorted second group of functions to extract an unsorted fifth group of functions from the unsorted second group of functions based on a second-level grouping attribute, and performing a sixth grouping operation on the unsorted second group of functions to extract an unsorted sixth group of functions from the unsorted second group of functions based on the second-level grouping attribute, the configuration file is further configured to apply a fifth reconstruction method to the unsorted fifth group of functions based on one or more fifth merging attributes contained in the unsorted fifth group of functions to generate a sorted fifth group of functions, and apply a sixth reconstruction method to the unsorted sixth group of functions based on one or more sixth merging attributes contained in the unsorted sixth group of functions to generate a sorted sixth group of functions, and the applying of the second reconstruction method to the unsorted second group of functions includes applying of the second reconstruction method to the sorted fifth group of functions and the sorted sixth group of functions based on the one or more second merging attributes contained in the unsorted second group of functions to generate the sorted second group of functions.

8. The method for process reconstruction of claim 1,
wherein the step of applying the respective different reconstruction methods, of the same process, runs in a first stage and a second stage,
  in the first stage, the process fragments belonging to the same process instance are collected as unlinked process fragments, and
  in the second stage, the unlinked process fragments collected for the same process instance are linked to each other in an event merge, the second stage includes a key merge procedure, wherein a process fragment identification attribute and a merge method have been previously configured for each of the process fragments.

9. The method of claim 1, wherein the determining uses the reconstructed process instance in a key performance indicator (KPI) tool that measures performance of the heterogeneous mix of the plurality of different systems and the plurality of different system types.

10. A system for process reconstruction, comprising:
  a memory; and
  a processor cooperatively operable with the memory, and configured to, based on instructions stored in the memory,
    extract a plurality of system type attributes and a plurality of associated system identification attributes from a plurality of pieces of data generated by a plurality of process fragments, respectively, produced on a heterogeneous mix of a plurality of different systems and a plurality of different system types, each of the system type attributes containing information identifying a type of a system that generated the data, and each of the system identification attributes containing information identifying the system that generated the data, wherein each of the process fragments is represented by data generated during execution of a step by a process instance;
    extract a process identification attribute from the plurality of pieces of data generated by the plurality of process fragments, respectively, the process identification attribute identifying the plurality of pieces of data as belonging to a same process instance;
    determine a hierarchy of functions within a same process instance based on a grouping operation, the hierarchy being based on the plurality of system type attributes and the plurality of system identification attributes of the plurality of different systems on which the same process instance was executed, wherein the grouping operation groups together in the hierarchy each of the process fragments which have a same system-type-attribute-and-system-identifier-attribute, wherein the process fragments in one grouping have the same system-type-attribute-and-system-identifier-attribute and belong to the same process instance;
    generate a configuration file for applying a plurality of different reconstruction methods, the configuration file being set to selectively apply each of the reconstruction methods based on the hierarchy of functions and a predetermined mapping table, the mapping table pairing the system-type-attribute-and-system-identifier-attribute of the plurality of different systems and the respective different reconstruction methods;
    apply the respective different reconstruction methods to the plurality of pieces of data generated by the process fragments in accordance with the configuration file, to reconstruct the same process instance, as a reconstructed process instance, with process fragments merged with functions in sequential order of a process flow of the same process instance, wherein (i) a type of reconstruction method is applied to the process fragments in each of the one grouping and thus a system particular sequence of the process fragments within the one grouping is correct for a particular system and system attribute, and then (ii) a sequence of reconstruction of the process fragments of the same process instance across the heterogeneous mix of the plurality of different systems and the plurality of different system types is applied based on the hierarchy; and providing the reconstructed process instance which represents all process fragments in correct sequence produced by the same process instance on the heterogeneous mix of the plurality of different systems and the plurality of different system types;
    further comprising, for the same process instance: first perform the grouping operation top down in the hierarchy of functions starting at a root of the hierarchy, and then perform the application of the respective different reconstruction methods bottom up in the hierarchy of functions starting at a lowest level of the hierarchy; and
    determine performance of a process using at least the reconstructed process instance.

11. The system for process reconstruction of claim 10, wherein the reconstruction methods include at least one of a sort merge, a key merge, and a process template merge.

12. The system for process reconstruction of claim 10, wherein, based on the grouping operation, the processor is further configured to
  perform a first grouping operation on a plurality of functions stored in one or more memory modules to extract an unsorted first group of functions from the one or more memory modules based on the process identification attribute;
  perform a second grouping operation on the unsorted first group of functions to extract an unsorted second group of functions from the unsorted first group of functions based on a first first-level grouping attribute; and
  perform a third grouping operation on the unsorted first group of functions to extract an unsorted third group of functions from the unsorted first group of functions based on the first first-level grouping attribute.

13. The system for process reconstruction of claim 12, wherein,
  based on the configuration file, the processor is further configured to
    apply a third reconstruction method to the unsorted third group of functions based on one or more third merging attributes contained in the unsorted third group of functions to generate a sorted third group of functions,
    apply a second reconstruction method to the unsorted second group of functions based on one or more second merging attributes contained in the unsorted second group of functions to generate a sorted second group of functions, and
    apply a first reconstruction method to the sorted second and third groups of functions based on one or more first merging attributes contained in the sorted second and third groups of functions to generate a sorted first group of functions, and the first merging attributes, the second merging attributes, and the third merging attributes include at least two different types of merging attributes.

14. The system for process reconstruction of claim 13, wherein the at least two different types of merging attributes include integer time stamp merging attributes and predecessor reference merging attributes.

15. The system for process reconstruction of claim 13, wherein
based on the grouping operation, the processor is further configured to perform a fourth grouping operation on the unsorted first group of functions to extract an unsorted fourth group of functions from the unsorted first group of functions based on a second first-level grouping attribute,
based on the configuration file, the processor is further configured to apply a fourth reconstruction method to the unsorted fourth group of functions based on one or more fourth merging attributes contained in the unsorted fourth group of functions to generate a sorted fourth group of functions, and
the processor is further configured to apply the fourth reconstruction method to the sorted second, third, and fourth groups of functions based on one or more first merging attributes contained in the sorted second, third, and fourth groups of functions to generate the sorted first group of functions.

16. The system for process reconstruction of claim 13, wherein
based on the grouping operation, the processor is further configured to
perform a fifth grouping operation on the unsorted second group of functions to extract an unsorted fifth group of functions from the unsorted second group of functions based on a second-level grouping attribute, and
perform a sixth grouping operation on the unsorted second group of functions to extract an unsorted sixth group of functions from the unsorted second group of functions based on the second-level grouping attribute,
based on the configuration file, the processor is further configured to
apply a fifth reconstruction method to the unsorted fifth group of functions based on one or more fifth merging attributes contained in the unsorted fifth group of functions to generate a sorted fifth group of functions, and
apply a sixth reconstruction method to the unsorted sixth group of functions based on one or more sixth merging attributes contained in the unsorted sixth group of functions to generate a sorted sixth group of functions, and
the applying of the second reconstruction method to the unsorted second group of functions includes applying of the second reconstruction method to the sorted fifth group of functions and the sorted sixth group of functions based on the one or more second merging attributes contained in the unsorted second group of functions to generate the sorted second group of functions.

17. The system for process reconstruction of claim 10, wherein the determining uses the reconstructed process instance in a KPI tool that measures performance of the heterogeneous mix of the plurality of different systems and the plurality of different system types.

18. A non-transitory computer-readable medium comprising executable instructions for a method for process reconstruction, the instructions being executed to perform:
extracting a plurality of system type attributes and a plurality of associated system identification attributes from a plurality of pieces of data generated by a plurality of process fragments, respectively, produced on a heterogeneous mix of a plurality of different systems and a plurality of different system types, each of the system type attributes containing information identifying a type of a system that generated the data, and each of the system identification attributes containing information identifying the system that generated the data, wherein each of the process fragments is represented by data generated during execution of a step by a process instance;
extracting a process identification attribute from the plurality of pieces of data generated by the plurality of process fragments, respectively, the process identification attribute identifying the plurality of pieces of data as belonging to a same process instance;
determining a hierarchy of functions within the same process instance based on a grouping operation, the hierarchy being based on the plurality of system type attributes and the plurality of system identification attributes of the plurality of different systems on which the same process instance was executed, wherein the grouping operation groups together in the hierarchy each of the process fragments which have a same system-type-attribute-and-system-identifier-attribute, wherein the process fragments in one grouping have the same system-type-attribute-and-system-identifier-attribute and belong to the same process instance;
generating a configuration file for applying a plurality of different reconstruction methods, the configuration file being set to selectively apply each of the reconstruction methods based on the hierarchy of functions and a predetermined mapping table, the mapping table pairing the system-type-attribute-and-system-identifier-attribute of the plurality of different systems and the respective different reconstruction methods;
applying the respective different reconstruction methods to the plurality of pieces of data generated by the process fragments in accordance with the configuration file, to reconstruct the same process instance, as a reconstructed process instance, with the process fragments merged with functions in sequential order of a process flow of the same process instance, wherein (i) a type of reconstruction method is applied to the process fragments in each of the one grouping and thus a system particular sequence of the process fragments within the one grouping is correct for a particular system and system attribute, and then (ii) a sequence of reconstruction of the process fragments of the same process instance across the heterogeneous mix of the plurality of different systems and the plurality of different system types is applied based on the hierarchy; and providing the reconstructed process instance which represents all process fragments in correct sequence produced by the same process instance on the heterogeneous mix of the plurality of different systems and the plurality of different system types;
further comprising, for the same process instance: first performing the grouping operation top down in the hierarchy of functions starting at a root of the hierarchy, and then performing the applying of the respective different reconstruction methods bottom up in the hierarchy of functions starting at a lowest level of the hierarchy; and determining performance of a process using at least the reconstructed process instance.

19. The non-transitory computer-readable medium of claim 18, wherein the grouping operation further comprises performing a first grouping operation on a plurality of functions stored in one or more memory modules to extract an unsorted first group of functions from the one or more memory modules based on the process identification attribute;

performing a second grouping operation on the unsorted first group of functions to extract an unsorted second group of functions from the unsorted first group of functions based on a first first-level grouping attribute; and performing a third grouping operation on the unsorted first group of functions to extract an unsorted third group of functions from the unsorted first group of functions based on the first first-level grouping attribute.

20. The non-transitory computer-readable medium of claim 19, wherein the configuration file is configured to apply a third reconstruction method to the unsorted third group of functions based on one or more third merging attributes contained in the unsorted third group of functions to generate a sorted third group of functions, apply a second reconstruction method to the unsorted second group of functions based on one or more second merging attributes contained in the unsorted second group of functions to generate a sorted second group of functions, and apply a first reconstruction method to the sorted second and third groups of functions based on one or more first merging attributes contained in the sorted second and third groups of functions to generate a sorted first group of functions, and the first merging attributes, the second merging attributes, and the third merging attributes include at least two different types of merging attributes.

21. The non-transitory computer-readable medium of claim 20, wherein the at least two different types of merging attributes include integer time stamp merging attributes and predecessor reference merging attributes.

22. The non-transitory computer-readable medium of claim 20, wherein the grouping operation further comprises performing a fourth grouping operation on the unsorted first group of functions to extract an unsorted fourth group of functions from the unsorted first group of functions based on a second first-level grouping attribute; and the configuration file is further configured to apply a fourth reconstruction method to the unsorted fourth group of functions based on one or more fourth merging attributes contained in the unsorted fourth group of functions to generate a sorted fourth group of functions, and the fourth reconstruction method is applied to the sorted second, third, and fourth groups of functions based on one or more first merging attributes contained in the sorted second, third, and fourth groups of functions to generate the sorted first group of functions.

23. The non-transitory computer-readable medium of claim 20, wherein the grouping operation further comprises performing a fifth grouping operation on the unsorted second group of functions to extract an unsorted fifth group of functions from the unsorted second group of functions based on a second-level grouping attribute, and performing a sixth grouping operation on the unsorted second group of functions to extract an unsorted sixth group of functions from the unsorted second group of functions based on the second-level grouping attribute, the configuration file is further configured to apply a fifth reconstruction method to the unsorted fifth group of functions based on one or more fifth merging attributes contained in the unsorted fifth group of functions to generate a sorted fifth group of functions, and apply a sixth reconstruction method to the unsorted sixth group of functions based on one or more sixth merging attributes contained in the unsorted sixth group of functions to generate a sorted sixth group of functions, and the applying of the second reconstruction method to the unsorted second group of functions includes applying of the second reconstruction method to the sorted fifth group of functions and the sorted sixth group of functions based on the one or more second merging attributes contained in the unsorted second group of functions to generate the sorted second group of functions.

24. The non-transitory computer-readable medium of claim 18, wherein the determining uses the reconstructed process instance in a KPI tool that measures performance of the heterogeneous mix of the plurality of different systems and the plurality of different system types.

* * * * *